United States Patent
Tanigawa

(10) Patent No.: US 8,111,876 B2
(45) Date of Patent: Feb. 7, 2012

(54) OBJECT POSITION ESTIMATING SYSTEM, OBJECT POSITION ESTIMATING APPARATUS, OBJECT POSITION ESTIMATING METHOD, AND OBJECT POSITION ESTIMATING PROGRAM

(75) Inventor: Toru Tanigawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 36 days.

(21) Appl. No.: 12/840,593

(22) Filed: Jul. 21, 2010

(65) Prior Publication Data

US 2010/0284571 A1 Nov. 11, 2010

Related U.S. Application Data

(63) Continuation of application No. PCT/JP2009/005777, filed on Oct. 30, 2009.

(30) Foreign Application Priority Data

Nov. 5, 2008 (JP) ................................. 2008-284092

(51) Int. Cl.
*G06K 9/00* (2006.01)
(52) U.S. Cl. ........... 382/106; 382/107; 702/95; 702/150
(58) Field of Classification Search .................. 382/102, 382/105, 106; 707/5; 702/95, 150
See application file for complete search history.

(56) References Cited

U.S. PATENT DOCUMENTS

| 7,206,668 | B2 * | 4/2007 | Okamoto et al. ............. 700/245 |
| 2002/0019843 | A1 | 2/2002 | Killian et al. |
| 2002/0183979 | A1 * | 12/2002 | Wildman ....................... 702/188 |
| 2003/0069900 | A1 * | 4/2003 | Hind et al. .................... 707/200 |
| 2007/0208736 | A1 * | 9/2007 | Tanigawa et al. ................. 707/5 |

FOREIGN PATENT DOCUMENTS

| JP | 8-202825 | 8/1996 |
| JP | 11-353256 | 12/1999 |
| JP | 2002-41308 | 2/2002 |
| JP | 2007-240295 | 9/2007 |
| JP | 2008-249640 | 10/2008 |
| JP | 2008249640 | * 10/2008 |
| WO | 2007/015548 | 2/2007 |

OTHER PUBLICATIONS

International Preliminary Report on Patentability (translation) and Written Opinion of the International Searching Authority (translation) issued Jun. 7, 2011 in corresponding International (PCT) Application No. PCT/JP2008/005777.
International Search Report issued Jan. 12, 2010 in International (PCT) Application No. PCT/JP2009/005777.

* cited by examiner

*Primary Examiner* — Daniel Mariam
*Assistant Examiner* — Nancy Bitar
(74) *Attorney, Agent, or Firm* — Wenderoth, Lind & Ponack, L.L.P.

(57) ABSTRACT

A plurality of pieces of observation raw data observed by an observation unit are subjected to an object identifying process, and by using a parameter determined by a parameter determination unit in accordance with a period of time between a point of object identifying process completion time of one piece of data and process completion scheduled time of another piece of data, a position estimating process of the object is carried out from the data that has been subjected to the object identifying process, and the position of the object relating to the object ID is estimated based upon the object ID and positional candidates acquired by an object identifying unit.

8 Claims, 26 Drawing Sheets

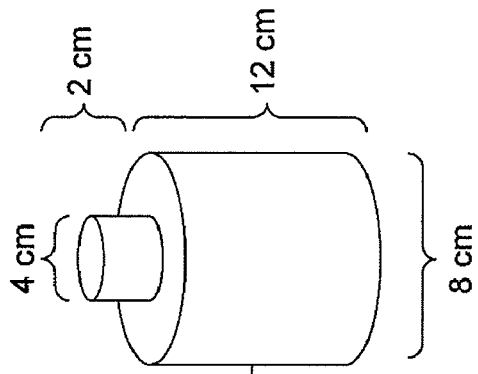
Fig.2
| OBJECT ID | SHAPE INFORMATION |
|---|---|
| Obj_001 | 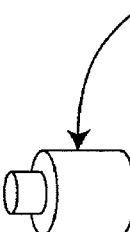 |
| Obj_002 | 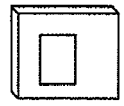 |
| Obj_003 |  |
| Obj_004 |  |
| Obj_005 | 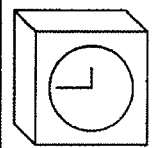 |

| ANGLE | 1 DEGREE | 2 DEGREES | ·· | 84 DEGREES | 85 DEGREES | ·· | 95 DEGREES | 96 DEGREES | ·· | 360 DEGREES |
|---|---|---|---|---|---|---|---|---|---|---|
| DISTANCE | 130 cm | 130 cm | ·· | 120 cm | 46 cm | ·· | 46 cm | 120 cm | ·· | 130 cm |

Fig.5

(a) TBL_001 (SEPT 11, 2007, 14:17':20" PRESENT STATUS)

| OBSERVATION DEVICE ID | OBSERVATION DATA | RAW DATA PROCESSING COMPLETION SCHEDULED TIME |
|---|---|---|
| 501 | Obj_001(65, 20), Obj_002(120, 26) | |
| 503 | | SEPT 11, 2007, 14:17':26" |
| 502 | | SEPT 11, 2007, 14:17':34" |

(b) TBL_002 (SEPT 11, 2007, 14:17':26" PRESENT STATUS)

| OBSERVATION DEVICE ID | OBSERVATION DATA | RAW DATA PROCESSING COMPLETION SCHEDULED TIME |
|---|---|---|
| 501 | Obj_001(65, 20), Obj_002(120, 26) | |
| 503 | | SEPT 11, 2007, 14:17':26" |
| 502 | | SEPT 11, 2007, 14:17':34" |
| 503 | Obj_004(266, 37), Obj_005(322, 21) | |
| 501 | | SEPT 11, 2007, 14:17':38" |

(c) TBL_003 (SEPT 11, 2007, 14:17':34" PRESENT STATUS)

| OBSERVATION DEVICE ID | OBSERVATION DATA | RAW DATA PROCESSING COMPLETION SCHEDULED TIME |
|---|---|---|
| 501 | Obj_001(65, 20), Obj_002(120, 26) | |
| 503 | | SEPT 11, 2007, 14:17':26" |
| 502 | | SEPT 11, 2007, 14:17':34" |
| 503 | Obj_004(266, 37), Obj_005(322, 21) | |
| 501 | | SEPT 11, 2007, 14:17':38" |
| 502 | Obj_002(119, 28), Obj_003(197, 69), Obj_004(266, 36) | |
| 503 | | SEPT 11, 2007, 14:17':48" |

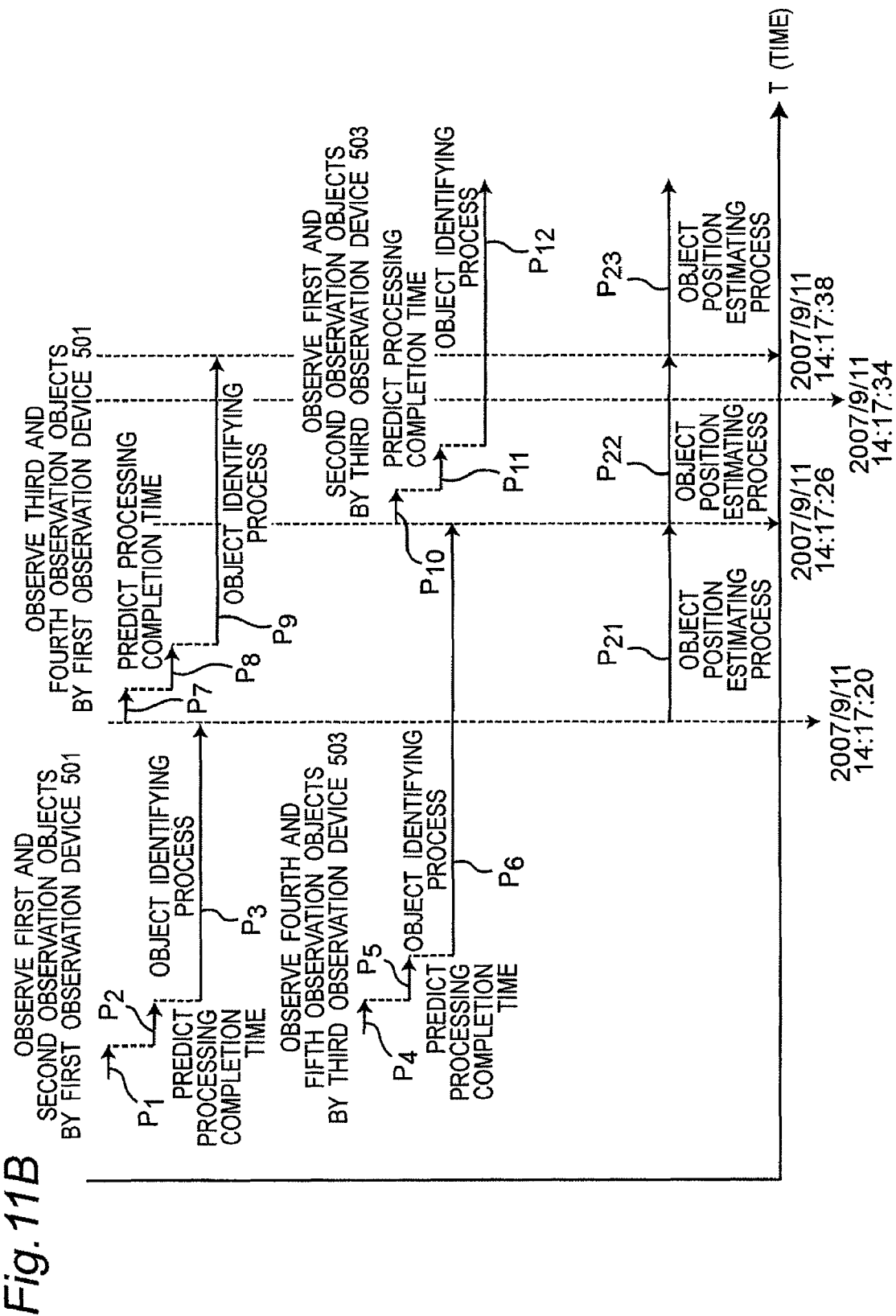

POSITION OF PURSE
15 PARTICLES

EXAMPLE OF
PURSE POSITION
30 PARTICLES

*Fig.18*

| NUMBER OF PARTICLES | PROCESSING TIME PER OBJECT |
|---|---|
| 100 | SHORT |
| 200 (REFERENCE NUMBER OF PARTICLES) | MEDIUM |
| 300 | LONG |

Fig.20A

TBL_004 (SEPT 11, 2007, 14:17':20" PRESENT STATUS)

| OBSERVATION DEVICE ID | OBSERVATION DATA | RAW DATA PROCESSING COMPLETION SCHEDULED TIME |
|---|---|---|
| 501 | Obj_001(65, 20), Obj_002(120, 26) | |

Fig. 20B

TBL_005 (SEPT 11, 2007, 14:17':34" PRESENT STATUS)

| OBSERVATION DEVICE ID | OBSERVATION OBJECT POSITION | RAW DATA PROCESSING COMPLETION SCHEDULED TIME |
|---|---|---|
| 501 | Obj_001(65, 19), Obj_002(121, 26) | |
| 503 | | SEPT 11, 2007, 14:17':26" |
| 502 | | SEPT 11, 2007, 14:17':34" |
| 503 | Obj_004(266, 37), Obj_005(322, 21) | |
| 501 | | SEPT 11, 2007, 14:17':38" |
| 502 | Obj_002(119, 28), Obj_003(197, 69), Obj_004(266, 36) | |
| 503 | | SEPT 11, 2007, 14:17':48" |

Fig.25

TBL_006 (SEPT 11, 2007, 14:17':26" PRESENT STATUS)

| OBSERVATION DEVICE ID | OBSERVATION OBJECT POSITION | RAW DATA PROCESSING COMPLETION SCHEDULED TIME | OBSERVATION TIME |
|---|---|---|---|
| 501 | Obj_001(62, 19), Obj_002(121, 26) | | |
| 503 | | SEPT 11, 2007, 14:17':26" | SEPT 11, 2007, 14:17':15" |
| 502 | | SEPT 11, 2007, 14:17':34" | SEPT 11, 2007, 14:17':24" |
| 503 | Obj_004(266, 37), Obj_005(322, 21) | | |
| 501 | | SEPT 11, 2007, 14:17':38" | SEPT 11, 2007, 14:17':25" |

Fig.26

TBL_007 (SEPT 11, 2007, 14:17':26" PRESENT STATUS)

| OBSERVATION DEVICE ID | OBSERVATION OBJECT POSITION | MATCHING SCORE | RAW DATA PROCESSING COMPLETION SCHEDULED TIME | OBSERVATION TIME |
|---|---|---|---|---|
| 501 | Obj_001(65, 20), Obj_002(120, 26) | Obj_001(0, 8), Obj_002(0, 6) | | |
| 503 | | | SEPT 11, 2007, 14:17':26" | SEPT 11, 2007, 14:17':15" |
| 502 | | | SEPT 11, 2007, 14:17':34" | SEPT 11, 2007, 14:17':24" |
| 503 | Obj_004(266, 37), Obj_005(322, 21) | Obj_004(0, 7), Obj_005(0, 9) | | |
| 501 | | | SEPT 11, 2007, 14:17':38" | SEPT 11, 2007, 14:17':25" |

OBJECT POSITION ESTIMATING SYSTEM, OBJECT POSITION ESTIMATING APPARATUS, OBJECT POSITION ESTIMATING METHOD, AND OBJECT POSITION ESTIMATING PROGRAM

This is a continuation application of International Application No. PCT/JP2009/005777, filed Oct. 30, 2009.

BACKGROUND OF THE INVENTION

The present invention relates to an object position estimating system, and an object position estimating apparatus, an object position estimating method and an object position estimating program used for such a system that estimate a position of an object located within an environment based upon data observed by an observation unit, for example, in the order of earlier observation time.

In an attempt to estimate an ID and a position of a target object within an environment by identifying the target object that is present in the environment by the use of a sensor such as a camera, an operation, mainly classified into five processes, are required.

In the first process, the target object is photographed by a camera so that image data including the target object is obtained.

In the second process, by comparing the image data including the target object with a template of a background image preliminarily held, a differential image is obtained.

In the third process, by using a database in which pixel positions in the preliminarily held image data and positions within the environment are associated with one another, positional candidates of the object within the environment of the obtained differential image are obtained.

In the fourth process, by using a database in which IDs of objects preliminarily held and image data are made associated with each other, ID candidates of the object corresponding to the resulting differential image are obtained. Hereinafter, the third process (process in which positional candidates of the object are obtained) and the fourth process (process in which ID candidates of the object are obtained) are combinedly referred to as an "object identifying" process.

In the fifth process, since the date of the ID candidate and position candidate of individual objects have uncertainty, the most likely position of each of the objects is estimated by using data relating to the ID and position of the object previously obtained by a camera. The fifth process is hereinafter referred to as "position estimating" process.

It is necessary to carry out an object identifying process by which data obtained by allowing the sensor to observe the environment are converted to data relating to the ID candidates and positional candidates of the object that can be handled by the object position estimating process.

A period of time required for the position estimation (the fifth process) is longer than a period of time (from the first process to the fourth process) required for the observation of the environment by the sensor and the completion of the object identifying process. Therefore, in the case where each of data after the object identifying process is individually subjected to a position estimating process with respect to all the target objects located inside the environment, there is a delay time (waiting time for response) between a point of time when the sensor observes the environment and a point of time when the object identifying process is completed. FIG. 13 shows an example thereof. It is the time 14:17':20" (14 o'clock:17 minutes:20 seconds) when observation data 1 of the observation device 1 is subjected to the object identifying process so that the object position estimating process can be carried out. It is the time 14:17':26" when the observation data 2 of the observation device 2 is subjected to the object identifying process so that the object position estimating process can be carried out. However, at the point of time, 14:17':26", the object position estimating process of the observation data 1 has not been completed, with the result that the time when the object position estimating process of the observation data 2 can be started is from the time 14:17':30" when the object position estimating process of the observation data 1 has been completed. Consequently, there is a waiting period of time until the object position estimating process of the observation data 1 has been completed, before the object position estimating process of the observation data 2 is started.

As a method for reducing the waiting period of time for response from such a device or the like, for example, Patent Document 1 has disclosed a technique in which, a probability of abnormal response is found by statistically processing communication states or communication apparatus states collected up to the present time, the probability data of the abnormal response is found, and a time-out period of time is determined based upon the probability data of the abnormal response.

PRIOR ART DOCUMENT

Patent Document

Patent Document 1: JP-A No. 11-353256

SUMMARY OF THE INVENTION

Issues to be Solved by the Invention

However, since the time required for the object identifying process is also dependant on the kinds of sensors attached to the observation device and environmental states in which the sensors are used for observation, it is not possible to correctly determine the time required for the object identifying process, without pieces of information relating to the kind of the sensor and the environmental states.

As a result, in the case where the timing cycle of the object position estimating process is set faster than the correct time required for the object identifying process, a waiting period of time for the result of the object identifying process tends to occur, while, in the case where the timing cycle of the object position estimating process is set slower than the correct time, a waiting period of time for the result of the object position estimating process tends to occur. In this case, in an attempt to make the timing cycle of the object position estimating process faster, for example, a parameter used for carrying out the object position estimating process needs to be adjusted, or the amount of information of the result of the object identifying process to be used for the object position estimating process needs to be cut, and when the timing cycle of the object position estimating process is made too fast, the amount of information of the result of the object identifying process is cut too much, resulting in degradation of the object position estimating precision. In contrast, when the timing cycle of the object position estimating process is made too slow, it becomes only possible to roughly estimate a moving track of an object.

In view of these issues, it is an object of the present invention to provide an object position estimating system, object position estimating apparatus, object position estimating method, and object position estimating program, which preliminarily determine a period of time required for an object identifying process based upon observation raw data observed by an observation unit, and, by using parameters that can positively process unprocessed observation raw data within a period of time used for an object identifying process from the current time to a point of time when a next observation raw data is acquired, the object position estimating process is positively carried out so that both of a high-precision real time process and a high-precision object position estimating process can be achieved.

Means for Solving the Issues

In order to achieve the above objectives, the present invention has the following arrangements.

In accomplishing these and other aspects, according to a first aspect of the present invention, there is provided an object position estimating system comprising:

an observation unit configured to observe a state of an environment that includes an object placed therein to acquire first and second observation raw data;

an object identifying configured to acquire an ID of the object and positional candidates of the object based upon object identifying data for each of IDs of objects, preliminarily stored in an object database, and the observation raw data of the respective first and second observation raw data, and to respectively store the acquired ID of the object and information of the positional candidates of the object in an observation database;

an object identifying process completion time predicting configured to acquire a number of the objects located within the environment based upon the respective observation raw data of the first and second observation raw data, and to predict a completion scheduled time of an object identifying process, based upon a time at which each number of the objects is acquired, the number of objects respectively acquired, and a period of time required for the object identifying process in which each of IDs of the object and the positional candidates of the object per object, preliminarily stored, are acquired, and to store the completion scheduled time of each of the object identifying processes in the observation database;

an object position estimating configured to acquire the ID of the object and the positional candidates of the object stored in the observation database, and to estimate a position of the object based upon the acquired ID of the object, the acquired positional candidates of the object, and a dispersion state of the positional candidates of the object; and a parameter determination configured to refer to the completion scheduled time of the object identifying process of the second observation raw data stored in the observation database, at a time when the object identifying unit has acquired the ID of the object and the positional candidates of the object after completion of the object identifying process of the first observation raw data, and to determine as to whether or not the completion scheduled time of the object identifying process for the second observation raw data is stored in the observation database based upon the time that has been referred to, as well as, upon determination of a fact that the completion scheduled time of the object identifying process of the second observation raw data has been stored therein, to determine, by reference to a period of time required for carrying out a position estimating process for estimating the position of the object for each of the objects, preliminarily stored, a parameter by which a position estimating process of the object is carried out on the first observation raw data that has been subjected to the object identifying process, during a period of time from a time of the reference to the completion scheduled time of the object identifying process of the second observation raw data, while, upon determination of a fact that the completion scheduled time of the object identifying process of the second observation raw data has not been stored therein, to set a predetermined reference parameter as the parameter by which the position estimating process is carried out on the first observation raw data that has been subjected to the object identifying process, wherein by using the parameter determined by the parameter determination unit, the object position estimating unit carries out the position estimating process on the object contained in the data that has been subjected to the object identifying process, from the data, and estimates the position of the object relating to the object ID based upon the object ID and the positional candidates acquired by the object identifying unit.

According to a sixth aspect of the present invention, there is provided an object position estimating system comprising:

a data input unit capable of inputting data relating to at least an ID and a position of an object that has been subjected to an object identifying process and completion scheduled time of the object identifying process that is inputted after completion of the object identifying process of the data;

an observation database to store the data relating to the ID and position of the object received from the data input unit and the data relating to the input scheduled time;

an object position estimating configured to estimate the position of the object based upon the data relating to the ID and position of the object stored in the observation database; and a parameter determination configured to determine whether or not by reference to the completion scheduled time of the object identifying process stored in the observation database, the completion scheduled time of the object identifying process to be completed at an earliest time from a time of the reference is stored, and upon determination that the completion scheduled time of the object identifying process of the second observation raw data has been stored, by reference to a period of time required for carrying out the position estimating process for estimating the position of the object per object preliminarily stored, to determine a parameter by which the position estimating process of the object is carried out during a period of time from a time of the reference to the completion scheduled time of the object identifying process of the second observation raw data, while, upon determination of a fact that the completion scheduled time of the object identifying process of the second observation raw data has not been stored therein, to set a predetermined reference parameter as the parameter by which the position estimating process is carried out on the object, wherein by using the parameter determined by the parameter determination unit, the object position estimating unit carries out a position estimating process on the object based upon the data relating to the ID and position of the object stored in the observation database so as to estimate the position of the object.

According to a seventh aspect of the present invention, there is provided an object position estimating method comprising:

observing a state of an environment so that a plurality of pieces of observation raw data are acquired by an observation unit;

based upon the plurality of pieces of observation raw data, calculating an ID and a position of an object located within an observation range of the observation unit by using an object identifying unit so as to carry out the object identifying process;

predicting a point of time at which the object identifying process to be carried out by the object identifying unit is completed based upon each of the plurality of pieces of the observation raw data by using an object identifying a process completion time predicting unit so as to store the resulting times in an observation database;

referring to the completion scheduled time of the object identifying process stored in the observation database, determining as to whether or not the completion scheduled time of the object identifying process to be completed at an earliest point of time from the time of the reference is stored therein, by using a parameter determination unit;

upon determination of a fact that the completion scheduled time of the object identifying process of the second observation raw data has been stored therein, determining, by reference to a period of time required for carrying out the position estimating process for estimating the position of the object per object, preliminarily stored, a parameter by which the position estimating process is carried out on the object during a period of time from the time of the reference to the completion scheduled time of the object identifying process of the second observation raw data, while, upon determination of a fact that the completion scheduled time of the object identifying process of the second observation raw data has not been stored therein, setting a predetermined reference parameter as the parameter by which the position estimating process is carried out on the object, by using the parameter determination unit, wherein by using the parameter determined by the parameter determination unit, the object position estimating unit estimates the position of the object from the data relating to the ID and the position of the object calculated in the object identifying process.

According to an eighth aspect of the present invention, there is provided an object position estimating program allowing a computer to carry out functions of:

based upon a plurality of pieces of observation raw data acquired by observing a state of an environment by using an observation unit, calculating an ID and a position of an object located within an observation range of the observation unit so as to carry out an object identifying process;

predicting a point of time at which the object identifying process to be carried out by the object identifying function is completed based upon each of the plurality of pieces of the observation raw data so as to store the resulting times in an observation database;

referring to the completion scheduled time of the object identifying process stored in the observation database, determining as to whether or not the completion scheduled time of the object identifying process to be completed at an earliest point of time from a time of the reference is stored therein, and upon determination of a fact that the completion scheduled time of the object identifying process of the second observation raw data has been stored therein, determining, by reference to a period of time required for carrying out the position estimating process for estimating the position of the object per object, preliminarily stored, a parameter by which the position estimating process is carried out on the object during a period of time from a time of the reference to the completion scheduled time of the object identifying process of the second observation raw data, while upon determination of a fact that the completion scheduled time of the object identifying process of the second observation raw data has not been stored therein, setting a predetermined reference parameter as the parameter by which the position estimating process is carried out on the object, wherein by using the parameter determined by the parameter determination unit, carrying out an object position estimating function for estimating the position of the object, from the data relating to the ID and the position of the object calculated in the object identifying process by the object identifying process function.

Effects of the Invention

As described above, in the present invention, based upon the observation raw data obtained by the observation unit, the period of time required for the object identifying process, that is, the point of time when the next observation data (data that have been subjected to the object identifying process) are obtained, is preliminarily determined, and by determining the number of objects to be subjected to the position estimating process by using the observation data currently obtained, it becomes possible to provide the object position estimating system, the object position estimating apparatus, the object position estimating method, and the object position estimating program that can estimate the object position without a delay relative to the observation of the observation unit.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is a view that shows one example of an object database of the object position estimating system in accordance with the first and second embodiments of the present invention;

FIG. 11B is a timing chart obtained when the position of an object is estimated based upon the observation data and the scheduled time of the completion of the observation raw data processing shown in FIG. 5;

FIG. 18 is an explanatory view that shows one example of information indicating the relationship between the number of particles and processing time in accordance with the first, embodiment of the present invention;

FIG. 20A is a view that shows one example of an observation database in the object position estimating system in accordance with the first embodiment of the present invention;

FIG. 20B is a view that shows another example of the observation database in the object position estimating system in accordance with the first embodiment of the present invention;

FIG. 25 is a view that shows one example of an observation database of the object position estimating system in accordance with the third embodiment of the present invention; and FIG. 26 is a view that shows an example of the observation database in which a matching score of the object position estimating system in accordance with the first embodiment is recorded.

DETAILED DESCRIPTION OF THE PREFERRED EMBODIMENTS

Figure 1:
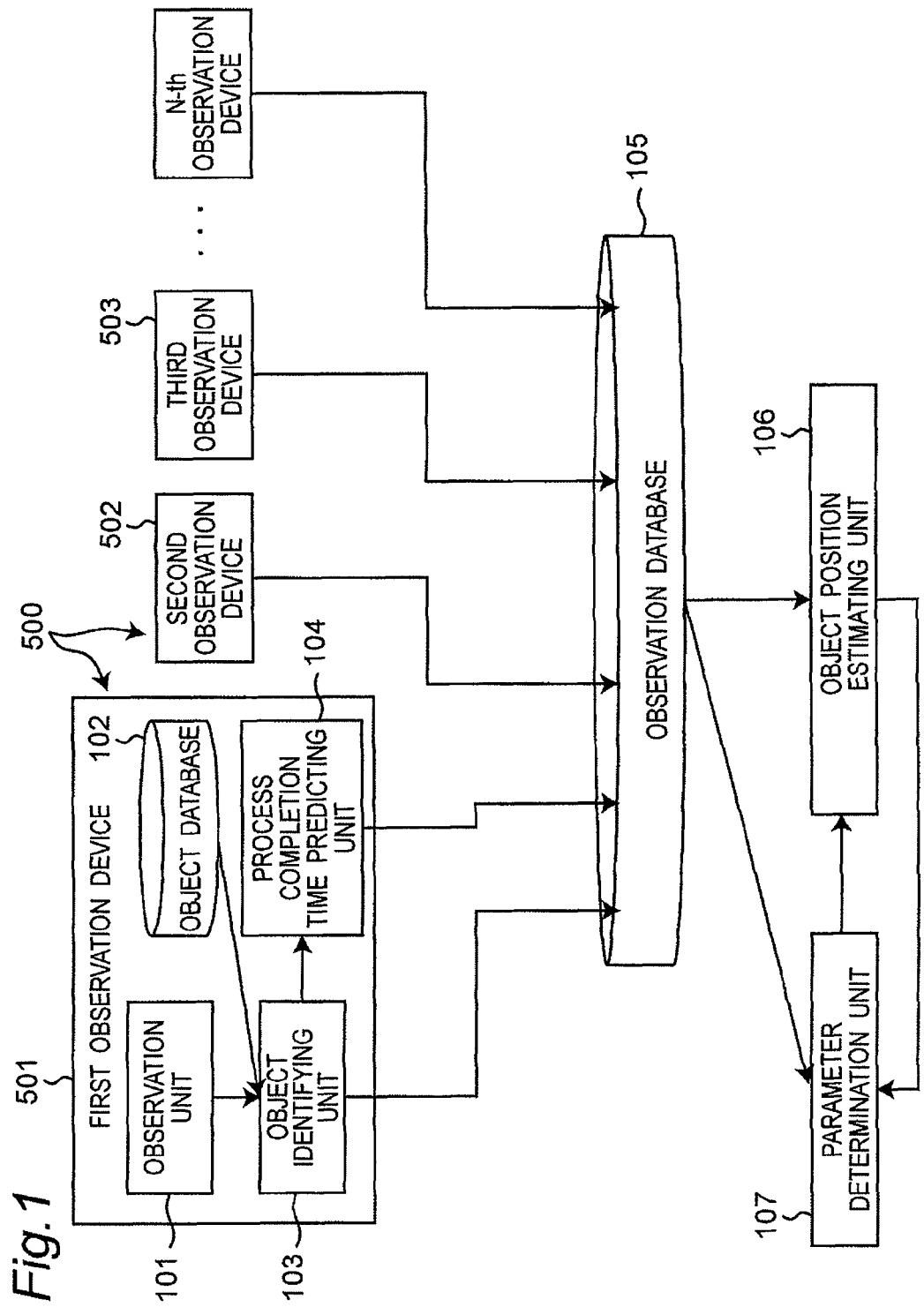
FIG. 1 is a block diagram that shows an object position estimating system in accordance with first and second embodiments of the present invention.

Before the description of the present invention proceeds, it is to be noted that like parts are designated by like reference numerals throughout the accompanying drawings.

Prior to the detailed description of embodiments of the present invention based upon the drawings, various aspects for the present invention will be explained.

According to a first aspect of the present invention, there is provided an object position estimating system comprising:

an observation unit configured to observe a state of an environment that includes an object placed therein to acquire first and second observation raw data;

an object identifying configured to acquire an ID of the object and positional candidates of the object based upon object identifying data for each of IDs of objects, preliminarily stored in an object database, and the observation raw data of the respective first and second observation raw data, and to respectively store the acquired ID of the object and information of the positional candidates of the object in an observation database;

an object identifying process completion time predicting configured to acquire a number of the objects located within the environment based upon the respective observation raw data of the first and second observation raw data, and to predict a completion scheduled time of an object identifying process, based upon a time at which each number of the objects is acquired, the number of objects respectively acquired, and a period of time required for the object identifying process in which each of IDs of the object and the positional candidates of the object per object, preliminarily stored, are acquired, and to store the completion scheduled time of each of the object identifying processes in the observation database;

an object position estimating configured to acquire the ID of the object and the positional candidates of the object stored in the observation database, and to estimate a position of the object based upon the acquired ID of the object, the acquired positional candidates of the object, and a dispersion state of the positional candidates of the object; and a parameter determination configured to refer to the completion scheduled time of the object identifying process of the second observation raw data stored in the observation database, at a time when the object identifying unit has acquired the ID of the object and the positional candidates of the object after completion of the object identifying process of the first observation raw data; and to determine as to whether or not the completion scheduled time of the object identifying process for the second observation raw data is stored in the observation database based upon the time that has been referred to, as well as, upon determination of a fact that the completion scheduled time of the object identifying process of the second observation raw data has been stored therein, to determine, by reference to a period of time required for carrying out a position estimating process for estimating the position of the object for each of the objects, preliminarily stored, a parameter by which a position estimating process of the object is carried out on the first observation raw data that has been subjected to the object identifying process, during a period of time from a time of the reference to the completion scheduled time of the object identifying process of the second observation raw data, while, upon determination of a fact that the completion scheduled time of the object identifying process of the second observation raw data has not been stored therein, to set a predetermined reference parameter as the parameter by which the position estimating process is carried out on the first observation raw data that has been subjected to the object identifying process, wherein by using the parameter determined by the parameter determination unit, the object position estimating unit carries out the position estimating process on the object contained in the data that has been subjected to the object identifying process, from the data, and estimates the position of the object relating to the object ID based upon the object ID and the positional candidates acquired by the object identifying unit.

According to a second aspect of the present invention, there is provided the object position estimating system according to the first aspect, wherein the object identifying data is shape information of the object, and the observation raw data is image data photographed by using a camera, or range data acquired by a range-measuring sensor, or positional data acquired by a tag reader.

According to a third aspect of the present invention, there is provided the object position estimating system according to the second aspect, wherein the data obtained by the camera or the range-measuring sensor is subjected to an object identifying process through a template matching process;

the object identifying unit stores a matching score outputted in the template matching process in the observation database; and the parameter determination unit determines an object to be subjected to the position estimating process in an order of a higher matching score.

According to a fourth aspect of the present invention, there is provided the object position estimating system according to the first or second aspects, wherein upon using a particle filter, the object position estimating unit preliminarily prepares relational information between a processing period of time per object and a number of particles, and calculates a number of objects that are processable by using the particle filter based upon a period of time from the time of the reference to the completion scheduled time of the object identifying process of the second observation raw data, and in a case where the calculated number of objects is same as the number of the objects identified by the object identifying process, the particle filter, as it is, is used for the process, while in a case where the calculated number of objects is smaller than the number of the objects identified by the object identifying process, the process is carried out with the number of particles per object being increased, and in a case where the calculated number of objects is greater than the number of the objects identified by the object identifying process, the process is carried out with the number of particles per object being reduced.

According to a fifth aspect of the present invention, there is provided the object position estimating system according to any one of the first to fourth aspects, further comprising:

a display configured to display a result of estimation by the object position estimating unit, wherein referring to the observation database, the display unit displays a completion scheduled time of a next object identifying process as an output time of result of next estimation of the object position estimating unit, while the display unit displays a time at which observation raw data relating to an output of current estimation result of the object position estimating unit as a point of time at which the current estimation result of the object position estimating unit is obtained.

According to a sixth aspect of the present invention, there is provided an object position estimating system comprising:

a data input unit capable of inputting data relating to at least an ID and a position of an object that has been subjected to an object identifying process and completion scheduled time of the object identifying process that is inputted after completion of the object identifying process of the data;

an observation database to store the data relating to the ID and position of the object received from the data input unit and the data relating to the input scheduled time;

an object position estimating configured to estimate the position of the object based upon the data relating to the ID and position of the object stored in the observation database; and a parameter determination configured to determine whether or not by reference to the completion scheduled time of the object identifying process stored in the observation database, the completion scheduled time of the object identifying process to be completed at an earliest time from a time of the reference is stored, and upon determination that the completion scheduled time of the object identifying process of the second observation raw data has been stored, by reference to a period of time required for carrying out the position estimating process for estimating the position of the object per object preliminarily stored, to determine a parameter by which the position estimating process of the object is carried out during a period of time from a time of the reference to the completion scheduled time of the object identifying process of the second observation raw data, while, upon determination of a fact that the completion scheduled time of the object identifying process of the second observation raw data has not been stored therein, to set a predetermined reference parameter as the parameter by which the position estimating process is carried out on the object, wherein by using the parameter determined by the parameter determination unit, the object position estimating unit carries out a position estimating process on the object based upon the data relating to the ID and position of the object stored in the observation database so as to estimate the position of the object.

According to a seventh aspect of the present invention, there is provided an object position estimating method comprising:

observing a state of an environment so that a plurality of pieces of observation raw data are acquired by an observation unit;

based upon the plurality of pieces of observation raw data, calculating an ID and a position of an object located within an observation range of the observation unit by using an object identifying unit so as to carry out the object identifying process;

predicting a point of time at which the object identifying process to be carried out by the object identifying unit is completed based upon each of the plurality of pieces of the observation raw data by using an object identifying a process completion time predicting unit so as to store the resulting times in an observation database;

referring to the completion scheduled time of the object identifying process stored in the observation database, determining as to whether or not the completion scheduled time of the object identifying process to be completed at an earliest point of time from the time of the reference is stored therein, by using a parameter determination unit;

upon determination of a fact that the completion scheduled time of the object identifying process of the second observation raw data has been stored therein, determining, by reference to a period of time required for carrying out the position estimating process for estimating the position of the object per object, preliminarily stored, a parameter by which the position estimating process is carried out on the object during a period of time from the time of the reference to the completion scheduled time of the object identifying process of the second observation raw data, while, upon determination of a fact that the completion scheduled time of the object identifying process of the second observation raw data has not been stored therein, setting a predetermined reference parameter as the parameter by which the position estimating process is carried out on the object, by using the parameter determination unit, wherein by using the parameter determined by the parameter determination unit, the object position estimating unit estimates the position of the object from the data relating to the ID and the position of the object calculated in the object identifying process.

According to an eighth aspect of the present invention, there is provided an object position estimating program allowing a computer to carry out functions of:

based upon a plurality of pieces of observation raw data acquired by observing a state of an environment by using an observation unit, calculating an ID and a position of an object located within an observation range of the observation unit so as to carry out an object identifying process;

predicting a point of time at which the object identifying process to be carried out by the object identifying function is completed based upon each of the plurality of pieces of the observation raw data so as to store the resulting times in an observation database;

referring to the completion scheduled time of the object identifying process stored in the observation database, determining as to whether or not the completion scheduled time of the object identifying process to be completed at an earliest point of time from a time of the reference is stored therein, and upon determination of a fact that the completion scheduled time of the object identifying process of the second observation raw data has been stored therein, determining, by reference to a period of time required for carrying out the position estimating process for estimating the position of the object per object, preliminarily stored, a parameter by which the position estimating process is carried out on the object during a period of time from a time of the reference to the completion scheduled time of the object identifying process of the second observation raw data, while upon determination of a fact that the completion scheduled time of the object identifying process of the second observation raw data has not been stored therein, setting a predetermined reference parameter as the parameter by which the position estimating process is carried out on the object, wherein by using the parameter determined by the parameter determination unit, carrying out an object position estimating function for estimating the position of the object, from the data relating to the ID and the position of the object calculated in the object identifying process by the object identifying process function.

In accordance with this arrangement, by determining the object to be subjected to the object position estimating process based upon the number of objects that can be processed within a waiting period of time until the next observation raw data to be required for the object position estimating process has been obtained, it is possible to provide the object position estimating system, the object position estimating apparatus, the object position estimating method, and the object position estimation program, which can achieve both of a high-precision real time process and a high-precision object position estimating process.

Referring to Figures, the following description will describe a first embodiment of the present invention in detail.

First Embodiment

FIG. 1 is a block diagram that shows an object position estimating system in accordance with a first embodiment of the present invention.

The present system is schematically provided with an observation unit 101 (observation means) and an object position estimating apparatus so that an object position estimating method is executed. The object position estimating apparatus includes an object database 102, an object identifying unit 103 (object identifying means), an identifying process completion time predicting unit 104 (identifying process completion time predicting means) (hereinafter, referred to simply as "process completion time predicting unit"), an observation database 105, an object position estimating unit 106 (object position estimating means), and a parameter determination unit 107 (parameter determination means). Additionally, the observation unit 101, the object identifying unit 103, and the identifying process completion time prediction unit 104 may be combined with one another, and dealt as a data input unit through which, at least, data relating to the IDs and positions of objects and the input scheduled time of the data can be inputted to the observation database 105.

The observation unit 101 observes states of an environment including objects (observation objects) located in the environment (space to be observed, for example, a life space (more specifically, a room such as a living room), or the like) so that observed raw data are obtained. More specifically, objects inside the environment are observed, and the observed raw data are obtained. As the observation unit 101, a camera, a range-measuring sensor, a UWB (Ultra Wide Band) tag reader, or the like, may be used.

In the object database 102, ID information of objects (hereinafter, referred to simply as "object ID") and information used for identifying the objects are stored. FIG. 2 shows one example of the object database 102. Pieces of information stored in the object database of FIG. 2 are object IDs from "Obj_001" to "Obj_005" and pieces of shape information of the respective five objects having IDs from "Obj_001" to "Obj_005". As the shape information, information relating to the outside appearance of an object and information relating to the size (dimension) thereof are stored. For example, FIG. 2 shows pieces of information relating to the outside appearance and the size of the object corresponding to the object ID "Obj_001" in an enlarged manner. In this case, the object having the object ID "Obj_001" includes a column having a large diameter and a column having a small diameter, which is fixed thereon, and the diameter of the column having a large diameter is 8 cm, with a height of 12 cm, and the diameter of the column having a small diameter is 4 cm, with a height of 2 cm.

The object identifying unit 103 calculates observation data relating to the ID and position of an object contained in the observation raw data, by carrying out an object-identifying process on the observation raw data observed by the observation unit 101. More specifically, based upon information (object-identifying data) used for identifying an object for each of the IDs of the objects preliminarily stored in the object database 102 and the observation raw data, the object identifying unit 103 acquires ID candidates of the object and position candidates of the object, and stores the pieces of information of the ID candidates of the object and position candidates of the object thus acquired in the observation database 105. In this case, "observation raw data" refer to data that have not been subjected to any processes relating to the observation of the observation unit 101, and for example, in the case of a camera or the like, these data correspond to image data picked up by a camera. In the case of the range-measuring sensor, these data correspond to range data, and in the case of the UWB tag reader, these data correspond to position data for the respective object IDs. In contrast, "observation data" refer to data that are calculated by using the observation raw data in the object-identifying unit 103, by applying the object-identifying unit 103 to the observation raw data, and correspond to data relating to the ID and position of an object that can be dealt by the object position estimating unit 106. The object-identifying unit 103, and the object position estimating unit 106 will be described later.

In the case where the observation unit 101 is a camera, the observation raw data is image data, and the object identifying unit 103 carries out image processing on the image data picked up by the camera. As the image processing, for example, a technique such as a template matching process is proposed. A current input image is compared with the background image of an environment preliminarily acquired when no object is placed within the environment so that an area having different pixel values is taken out as a differential area. In this case, however, when the differential area is taken out by the object identifying unit 103, since there is a possibility that noise is added to the input image, a limitation may be added by which, for example, an area in which a predetermined number or more of pixel values are coupled to one another is defined as the differential area. In the case where N-number of objects (where N is an integer of one or more) is placed in an environment, N-number of differential areas is obtained by the object identifying unit 103. Thereafter, the object identifying unit 103 carries out matching processes between the differential areas obtained by the object identifying unit 103 and outside appearance data (template images) of shape information stored in the object database 102 so that the ID of an object can be identified by the object identifying unit 103. More specifically, an object having the highest matching rate between the differential area and the outside appearance data is registered in the observation database 105 as the result of identification. In this case, the matching score (a rate of matching between the differential area and the template image) may also be registered in the observation database 105. A method for utilizing the matching score will be described later.

With respect to the position of an object within the environment, by preliminarily preparing a coordinates conversion formula by which the coordinates in an image and the coordinates in the environment are made in association with each other in the object identifying unit 103, the object identifying unit 103 is allowed to calculate the position.

Figure 15:
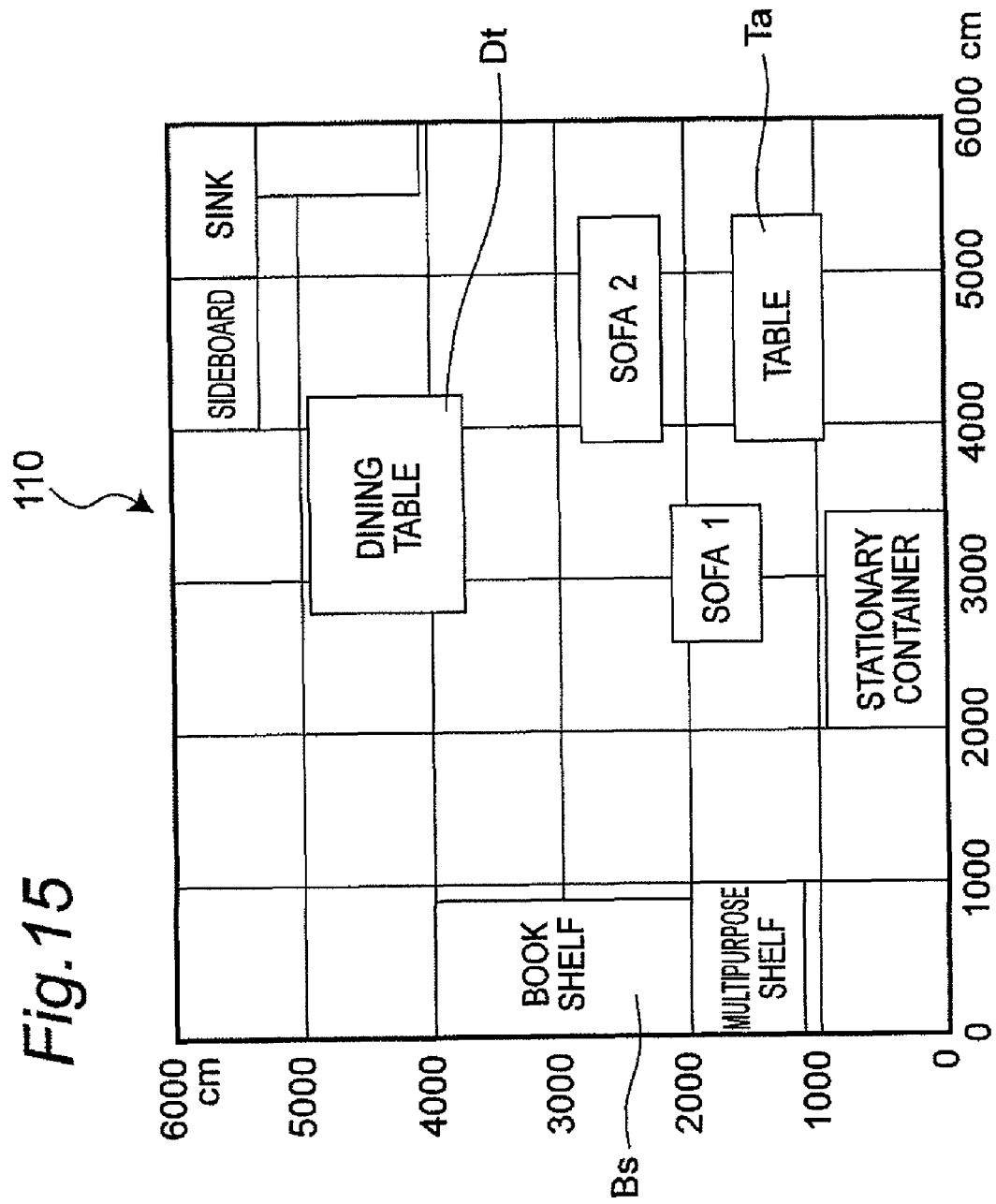
FIG. 15 is an explanatory view that shows one example of an environment background image obtained when a camera is used as the observation device in the object position estimating system in accordance with the first embodiment of the present invention.
Figure 16:
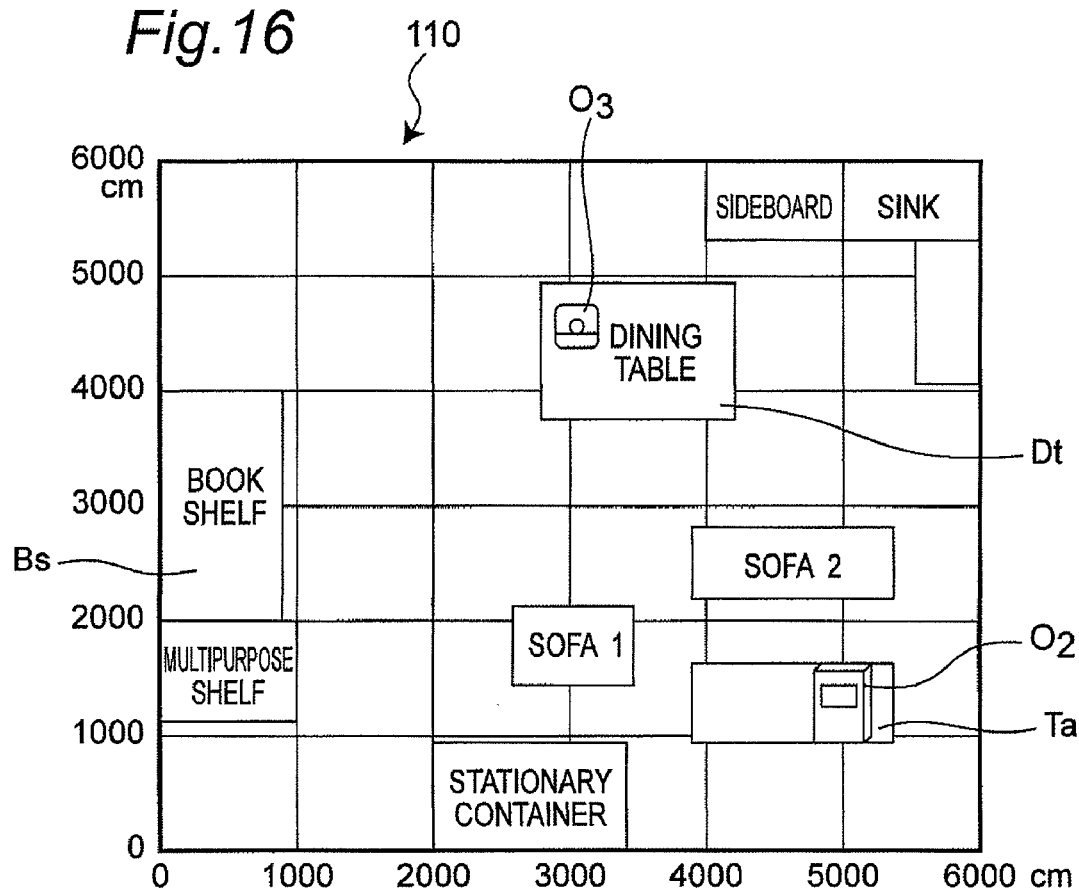
FIG. 16 is an explanatory view that shows one example of a camera input image obtained when a camera is used as the observation device in accordance with the first embodiment of the present invention.
Figure 17:
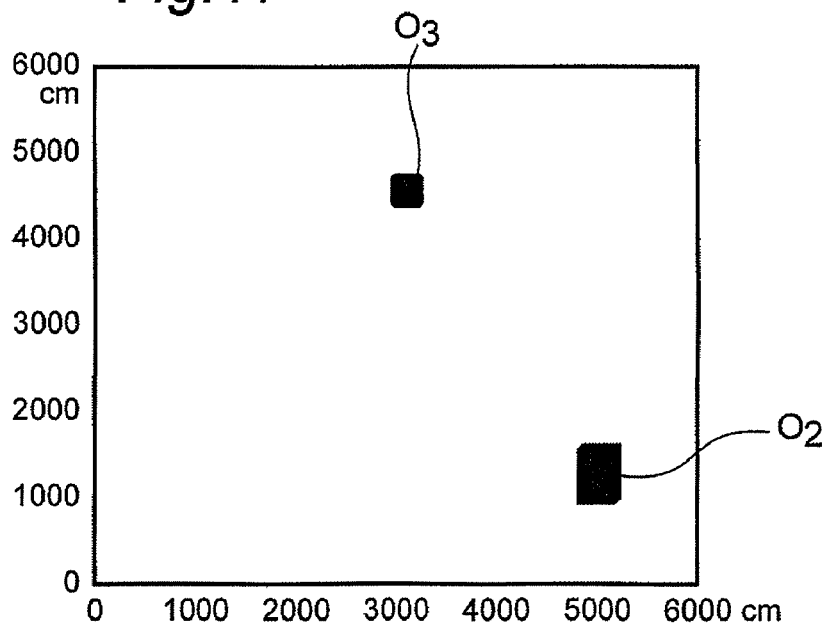
FIG. 17 is an explanatory view that shows one example of an image of a differential region obtained when a camera is used as the observation device in accordance with the first embodiment of the present invention.

FIG. 15 shows one example of a background image (environment background image) of an environment, FIG. 16 shows an example of an input image, and FIG. 17 shows one example of an image of a differential area, respectively. In this case, a life environment, such as a room 110 like a living room, is exemplified as the environment. As the environment background image to be prepared, a background in which no objects are placed in the environment is used. As shown in the environment background image of FIG. 15, furniture, such as a book shelf Bs, and electric appliances that are hardly moved may be included in the environment background image. In this case, however, since the furniture such as a book shelf Bs and electronic appliances are not taken out by the background differential process, the furniture such as a book shelf Bs and electronic appliances are excluded from objects to be position-estimated. An input image, shown in FIG. 16, represents a state, observed by a camera placed on a ceiling or the like of a room 110, in which a purse $O_3$ is placed on a dining table Dt and a book $O_2$ is placed on a table Ta. Differential areas in FIG. 17 show areas in which pixel values are different between the environment background image of FIG. 15 and the input image of FIG. 16; that is, the area of the purse $O_3$ and the area of the book $O_2$ are respectively shown. In this case, for example, the purse $O_3$ is defined as an object having an object ID "Obj_003" and the book $O_2$ is defined as an object having an object ID "Obj_002".

Figures 3, 4:
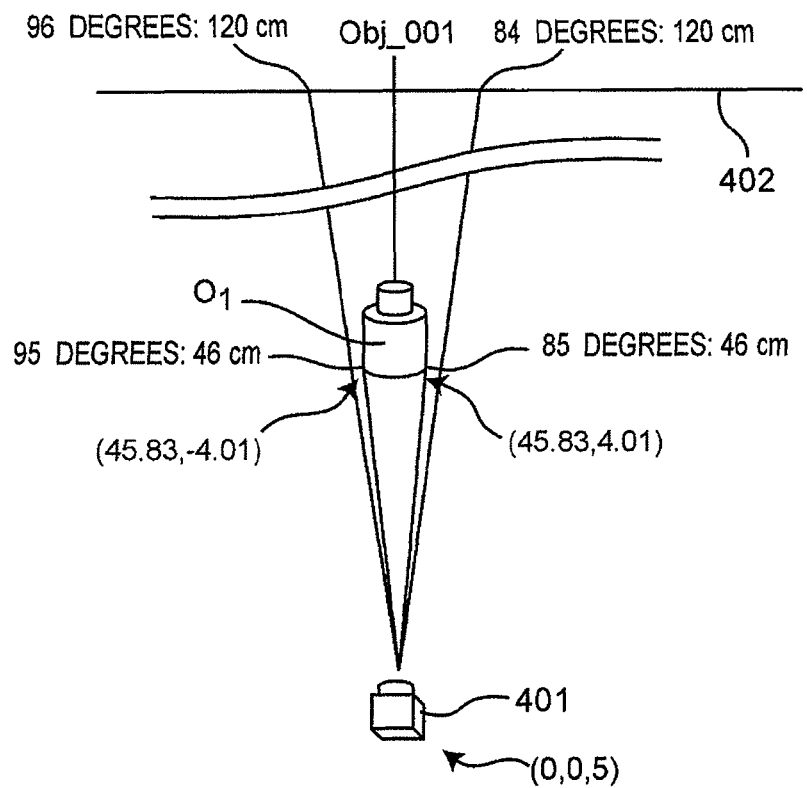
FIG. 3 is a view that shows one example of observation raw data obtained when a range-measuring sensor is used as an observation unit in accordance with the first and second embodiments of the present invention.
FIG. 4 is a view that shows one example of an observation state when the range-measuring sensor is used as the observation unit in accordance with the first and second embodiments of the present invention.

In the case where the observing unit 101 is a range-measuring sensor 401 (see FIG. 4) in place of the camera, the observation raw data is prepared as range data. FIG. 3 shows one example of range data. FIG. 3 shows range data in the case where the distance is obtained with a resolving power of 360 in 360 degrees around the sensor 401, and the data correspond to the results of observation when the observation is carried out by using the range-measuring sensor 401 in the state shown in FIG. 4. In order to identify the ID of an object from the range data, the identifying process is executed, for example, by using width information of the object. For simplicity of explanation, suppose that only the wall 402 is present at places 100 cm or more apart from the range-measuring sensor 401. In this case, in the distance within 100 cm, observation values are obtained within a range from 85 degrees to 95 degrees of 360 degrees so that it is supposed that the observed value at 85 degrees and the observed value at 95 degrees correspond to the two ends of the object $O_1$. Supposing that the position of the range-measuring sensor 401 is represented by (0 cm, 0 cm, 5 cm), with 0 degree in the +X-axis direction and 90 degrees in the +Y-axis direction, the coordinates of the two ends of the object $O_1$ are indicated by (sin 85°×46 cm, cos 85°×46 cm)=(45.83 cm, 4.01 cm) and (sin 95°×46 cm, cos 95°×46 cm)=(45.83 cm, −4.01 cm), and at a position 5 cm above the installation surface (installation position of the range-measuring sensor (0 cm, 0 cm, 5 cm)), the width of the object $O_1$ is estimated as about 8 cm.

Based upon the estimation result of the object width of the object $O_1$ and the shape information of the object $O_1$ stored in the object database 102, for example, the object $O_1$ is estimated as the object having the ID of "Obj_001". Moreover, the position of the object $O_1$ in the environment is estimated as the center value of the coordinates of the two ends. For example, in the above-mentioned example, the center value (45.83 cm, 0 cm) of the coordinates (45.83 cm, 4.01 cm) and the coordinates (45.83 cm, −4.01 cm) is estimated as the position of the object $O_1$ in the environment.

In the case where the observation unit 101 is a UWB tag reader, the observation raw data is positional data for each of the positions of the object IDs. At least three UWB tag readers are used. In order to detect an object by using the UWB tag readers, the tag needs to be preliminarily attached to each of the objects.

Figure 19:
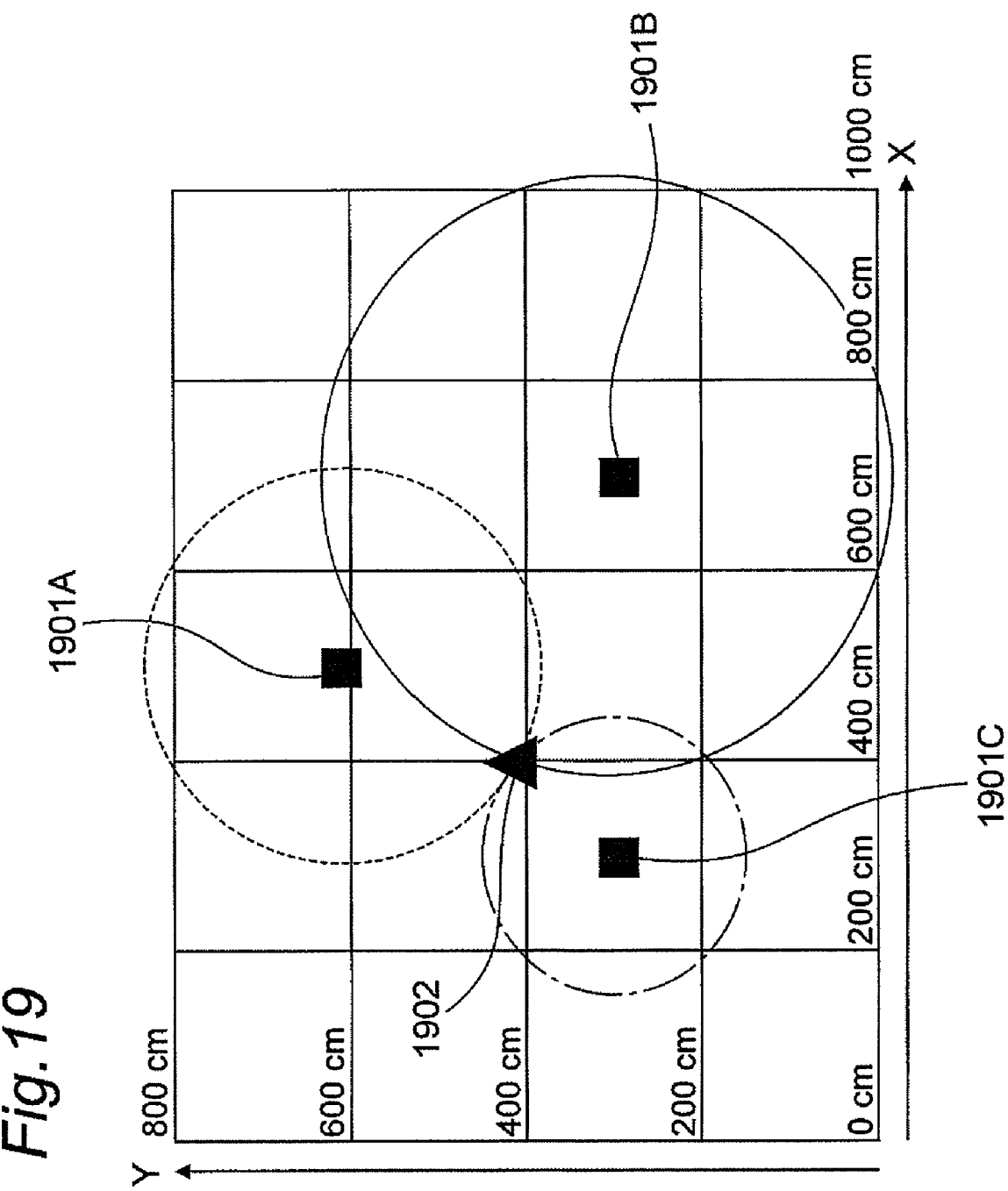
FIG. 19 is a view that shows a position-measuring method for a tag position of a UWB tag reader in the object position estimating system in accordance with the first embodiment of the present invention.

The local coordinates of an object detected by using at least three UWB tag readers can be determined based upon the principle of three-point survey. FIG. 19 shows an example of a method for detecting the position of the tag by using the three-point survey. In an environment shown in FIG. 19, a local station 1901A, a local station 1901B, and a local station 1901C, which are respectively connected to the UWB tag readers, are disposed. The local station 1901A is disposed at local coordinates (x, y)=(500, 600), the local station 1901B is disposed at local coordinates (x, y)=(700, 300), and the local station 1901C is disposed at local coordinates (x, y)=(300, 300). Suppose that the UWB tag readers know the local coordinates at which the three local stations are disposed. Each of the local stations measures a period of time required for a radio wave released from the local station to return to the local station from which it has been released, from the object to which the tag is attached, so that the distance from the corresponding local station to the tag can be calculated in each of the local stations. Under this circumstance, suppose that the object to which the tag 1902 is attached is located at local coordinates (x, y)=(400, 400). The local station 1901A finds that the tag 1902 is located on an arc having a distance of 223.61 cm from the tag 1902 as a radius from the position of the local station 1901A as the center. In the same manner, the local station 1901B finds that the tag 1902 is located on an arc having a radius of 316.23 cm therefrom, and the local station 1901C finds that the tag 1902 is located on an arc having a radius of 141.42 cm therefrom. It is determined that a position at which all the three arcs are superposed on one after another corresponds to the position at which the tag 1902 is located. In FIG. 19, the explanation is given as the tag position detecting process in a two-dimensional space. Upon carrying out the tag position detecting process in a real space (three-dimensional space), only the arc of FIG. 19 is changed to a spherical shape, and there are no changes in the other processes.

The process completion time predicting unit 104 preliminarily calculates a period of time required for the object identifying unit 103 to carry out the object identifying process (in this case, for example, a template matching process), and stores the resulting period of time in the observation database 105. Next, the process completion time predicting unit 104 receives a process algorithm for calculating the number (or amount) of observation data relating to the IDs and positions of objects from the observation raw data of the object identifying unit 103 or the number of processes from the object identifying unit 103 so as to predict the process completion scheduled time of the object identifying unit 103, and stores the predicted time in the observation database 105. The detailed description will be given below.

For example, in the case where the object identifying unit 103 is processing camera observation raw data, at a stage in which the object identifying unit 103 has taken out differential images, the process completion time predicting unit 104 receives information as to how many differential images have been obtained from the object identifying unit 103, and from the information as to how many differential images have been obtained, it predicts a period of time required for the template matching process. For example, supposing that it takes 0.2 seconds to carry out matching processes with 5 templates with respect to one differential image, the period of time required for the template matching processes is one second when five differential images have been obtained in the object identifying unit 103. At this time, the process completion scheduled time corresponds to 1 second after the time at which the background differential portions have been taken out because 0.2 seconds×5=1.0 second. That is, the process completion time predicting unit 104 preliminarily calculates the period of time required for the object identifying process (in this case, template matching process).

As shown in FIG. 1, the observation unit 101, the object database 102, the object identifying unit 103, and the process completion time predicting unit 104 are collectively referred to as a single observation device 500. Moreover, when observation devices 500 are individually distinguished from one another, they are referred to as a first measuring device 501, a second measuring device 502, a third measuring device 503, ... the n$^{th}$ measuring device (n is an integer of 1 or more).

In the observation database 105, ID information of each of the observation devices 500 (hereinafter, referred to simply as "observation device ID", and for convenience of explanation, IDs of the first to third observation devices 501, 502, and 503 are respectively referred to as "501", "502", and "503"), observation data relating to the observation object ID and the position of the observation object in the environment (for example, position coordinates), observation data relating to the observation object IDs and the positions (for example, positional coordinates) of the observation objects in the environment and the observation raw data process completion predicted time (for example, year/month/date and o'clock/minutes/seconds) are stored.

The following description will describe a flow of processes in which data are respectively stored in the observation database 105 by the object identifying unit 103 and the process completion time predicting unit 104.

First, the observation unit 101 observes the inside of an environment, and observation raw data is obtained.

Next, the process completion time predicting unit 104 calculates a period of time (observed raw data processing completion scheduled time) required for the object identifying unit 103 to process the observation raw data, and stores the resulting data in the observation database 105 as raw data processing completion scheduled time, together with the IDs of the observation devices 501, 502, and 503 included in the observation unit 101 that has acquired the observation raw data.

Next, by using the observation raw data obtained by the observation unit 101, the object identifying unit 103 starts an object identifying process.

Next, upon completion of the object identifying process of the observation raw data, the object identifying unit 103 stores the observation data in the observation database 105 together with the IDs of the observation devices 501, 502, and 503.

Figure 5:
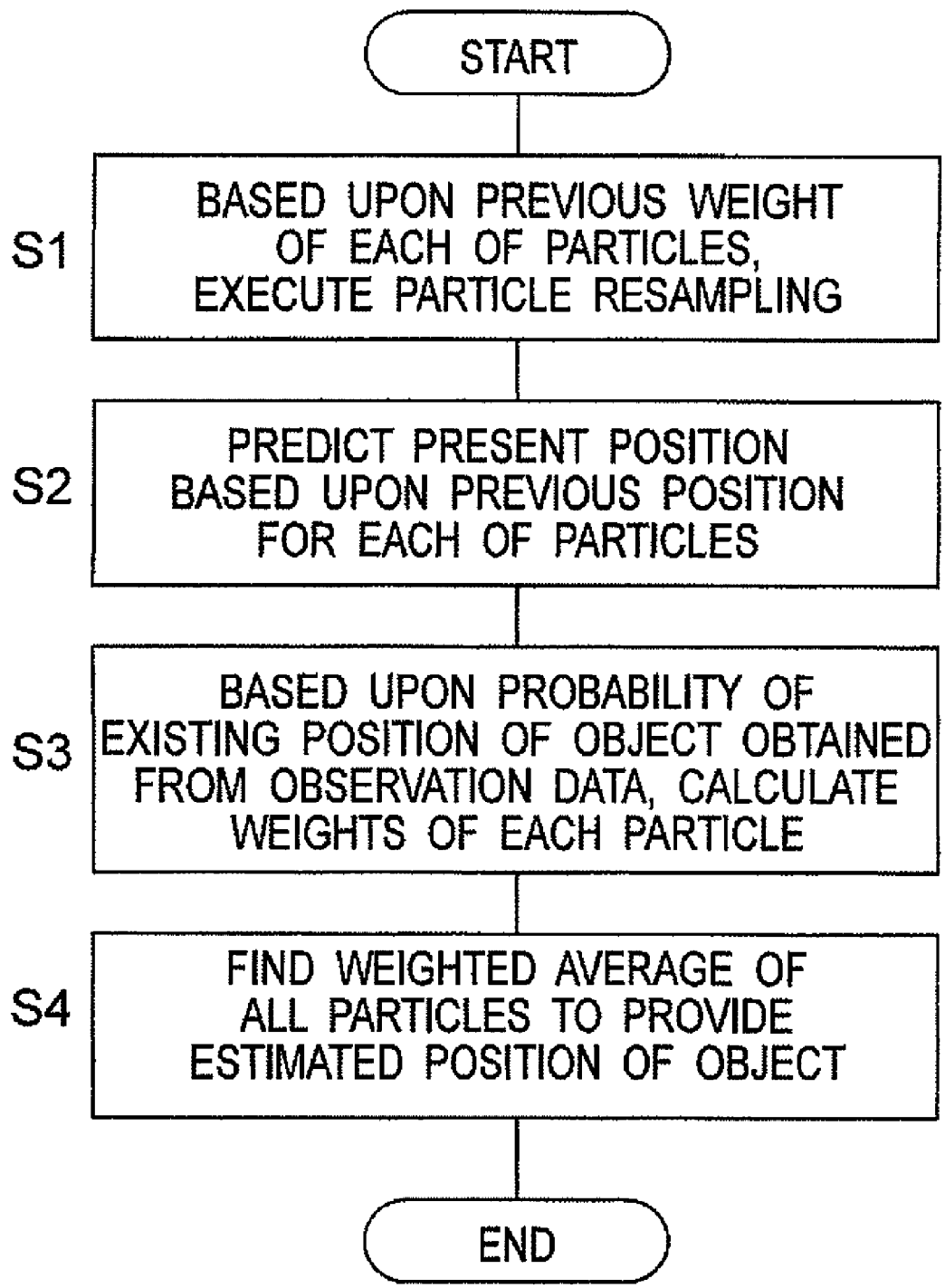
FIG. 5 is a view that shows one example of an observation database of the object position estimating system in accordance with the first and second embodiments of the present invention.

FIG. 5 shows one example of the observation database 105.

FIG. 5(a) illustrates a data table showing a data storage state of the observation database 105 at a point of time, 14 o'clock:17 minutes:20 seconds on Sep. 11, 2007 (ID of the data table showing this data storage state is referred to as "TBL_001"). FIG. 5(b) illustrates a data table showing a data storage state at a point of time, 14 o'clock:17 minutes:26 seconds on Sep. 11, 2007, 6 seconds after the previous time (ID of the data table showing this data storage state is referred to as "TBL_002"). In comparison with FIG. 5(a), in FIG. 5(b), data on the first and second lines from the bottom are added. FIG. 5(c) illustrates a data table showing a data storage state at a point of time, 14 o'clock:17 minutes:34 seconds, that is, 8 seconds after the state of FIG. 5(b) (ID of the data table showing this data storage state is referred to as "TBL_003"). In comparison with FIG. 5(b), in FIG. 5(c), data on the first and second lines from the bottom are added.

In the data table of the data table ID "TBL_001" of FIG. 5(a), observation data "Obj_001 (65, 20)", and "Obj_002 (120, 26)" from the observation device ID 501 after the completion of the object identifying process, as well as process completion scheduled times "14 o'clock:17 minutes:26 seconds" and "14 o'clock:17 minutes:34 seconds", that is, predicted process completion scheduled times of the observation raw data processing given by the observation devices ID 502, and ID 503, are respectively stored.

In the data table of the data table ID "TBL_002" of FIG. 5(b), observation data "Obj_004 (266, 37)", and "Obj_005 (322, 21)" from the observation device ID 503 are stored (see the second line from the bottom of the data table) in accordance with the observation raw data processing completion scheduled times, and from the observation device ID 501, the completion scheduled time of the object identifying process of the observation raw data is newly stored therein (see the first line from the bottom of the table). The same is true for the data table of the data table ID "TBL_003" of FIG. 5(c). That is, in the data table of the data table ID "TBL_003" of FIG. 5(c), observation data "Obj_002 (119, 28)", and "Obj_005 (322, 21)" from the observation device ID 502 are stored (see the second line from the bottom of the data table) in accordance with the observation raw data processing completion scheduled times, and from the observation device ID 503, the completion scheduled time of the observation raw data processing is newly stored therein (see the first line from the bottom of the table).

FIG. 26 shows an example of the observation database 105 in which the aforementioned matching score is recorded together with the observed object positions.

In the data table of the data table ID "TBL_007" of FIG. 26, the observation IDs, the observation object positions, the raw data processing completion scheduled times, and the observation times are recorded, together with the matching score.

In the items of the matching score, the ID and the score of an identified object are stored. For example, a matching score "Obj_001 (0.8)" indicates that the matching score (matching rate) between the differential area obtained by detecting an object and the template of the object "Obj_001" is 80%.

Upon receipt of an instruction from the parameter determination unit 107, based upon the observation data relating to the object ID and the position candidates of the object stored in the observation database 105, the object position estimating unit 106 estimates the position of the object by taking into consideration the distributed state of the position candidates of the object (for example, the position and weight of the object)(more specifically, by using a particle filter or a Kalman filter).

The following description will describe a difference between the position of the object estimated by the object position estimating unit 106 and the position candidate stored in the observation database 105. The position of the object stored in the observation database 105 is a position individually calculated by each of the observation devices 501, 502, and 503, and since these are normally different from one another depending on the observation devices 501, 502, and 503, due to positional errors caused by noise or the like contained in the respective observation devices 501, 502, and 503, these positions are dealt as position candidates of the object. In contrast, the position of an object estimated by the object position estimating unit 106 means a position having the highest rate of probability of presence selected from the object position candidates by the object position estimating process; thus, these two positions are clearly different from each other.

The explanation of the parameter determination unit 107 will be given later. The object position estimating process of the object position estimating unit 106 can be carried out by using, for example, a particle filter (for example, see Document: J. Hightower, B. Borriello. "The location Stack: A Layered Model for Location in Ubiquitous Computing", $4^{th}$ IEEE Workshop on Mobile Computer Systems & Applications (WMCSA2002), pp. 22-28. 2002). "Particle filter" refers to a method for approximating the probability distribution by using a large number of particles having state amounts and weights, and this method can carry out approximation on even a non-linear distribution. In this case, "state amounts" refer to positions of an object. Moreover, the sum of weights of all the particles is 1, and the number of the particles is preliminarily determined.

Figure 6:
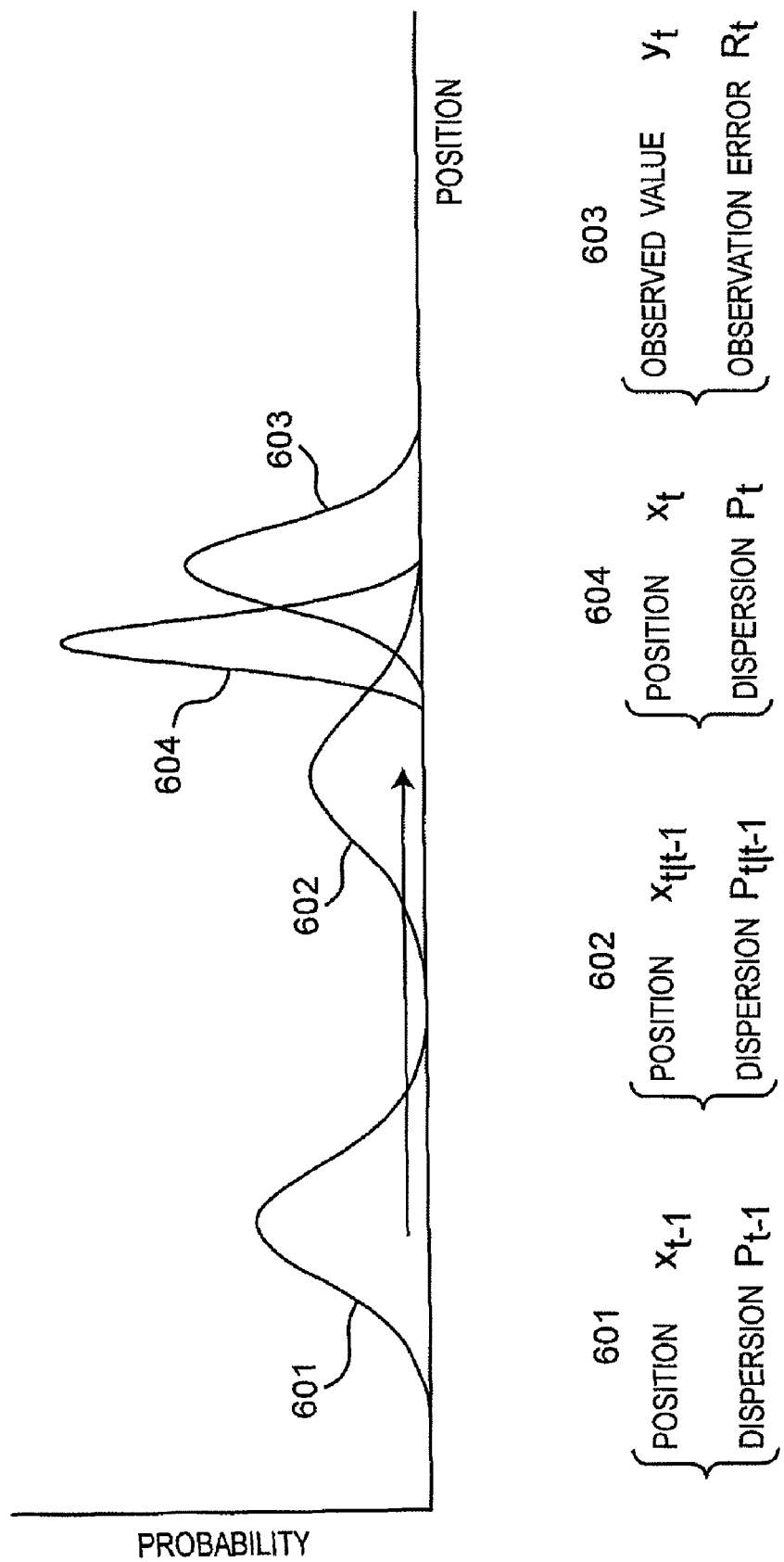
FIG. 6A is a flow chart that shows processes of an object position estimating method by the use of a particle filter that is applicable to the object position estimating system in accordance with the first embodiment.
FIG. 6B is a view that shows an example of a processing state of a Kalman filter that is applicable to the object position estimating system in accordance with the second embodiment.

Referring to FIG. 6A, the following description will describe the object position estimating method carried out by using the particle filter in the object position estimating unit 106.

In step S1 of FIG. 6A, based upon the weights of the respective particles previously obtained, a resampling process of the particles is carried out by the object position estimating unit 106. In this case, it is supposed that for the first time, the particles are generated at random by the object position estimating unit 106 within an environment.

Next, in second step S2, with respect to each of the particles, its present position is estimated by the object position estimating unit 106 from the previous position.

Next, in third step S3, based upon the probability of the existing position of the object obtained from the observation data, the weights of the respective particles are calculated by the object position estimating unit 106.

Next, in fourth step S4, the weighted average of all the particles is found by the object position estimating unit 106, and the weighted average thus found is defined as an estimated position of the object by the object position estimating unit 106.

Figure 14A:
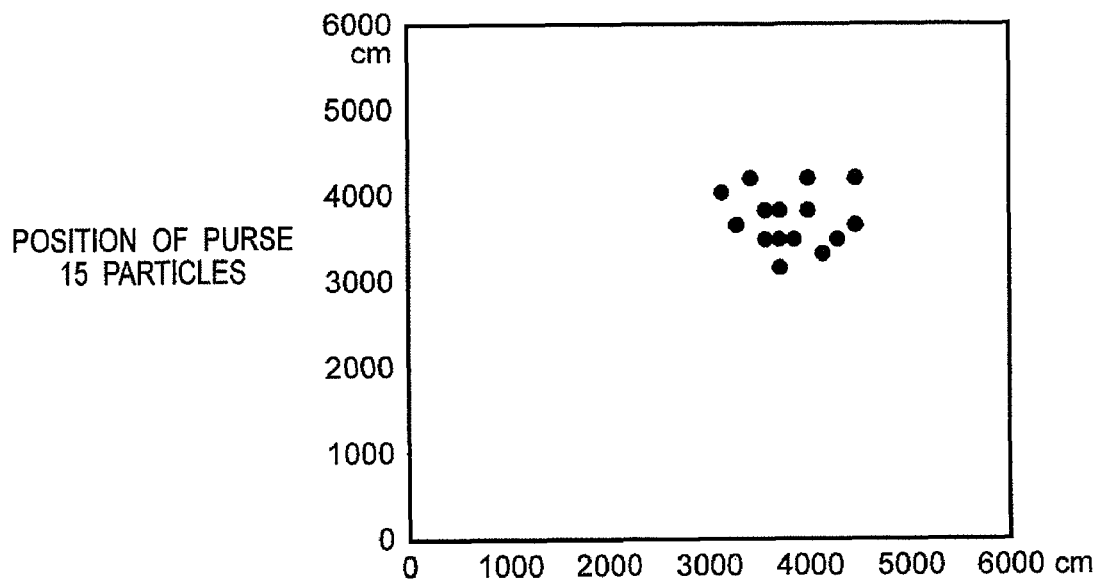
FIG. 14A is a comparison view with respect to approximation precision classified depending on the numbers of particles.
Figure 14B:
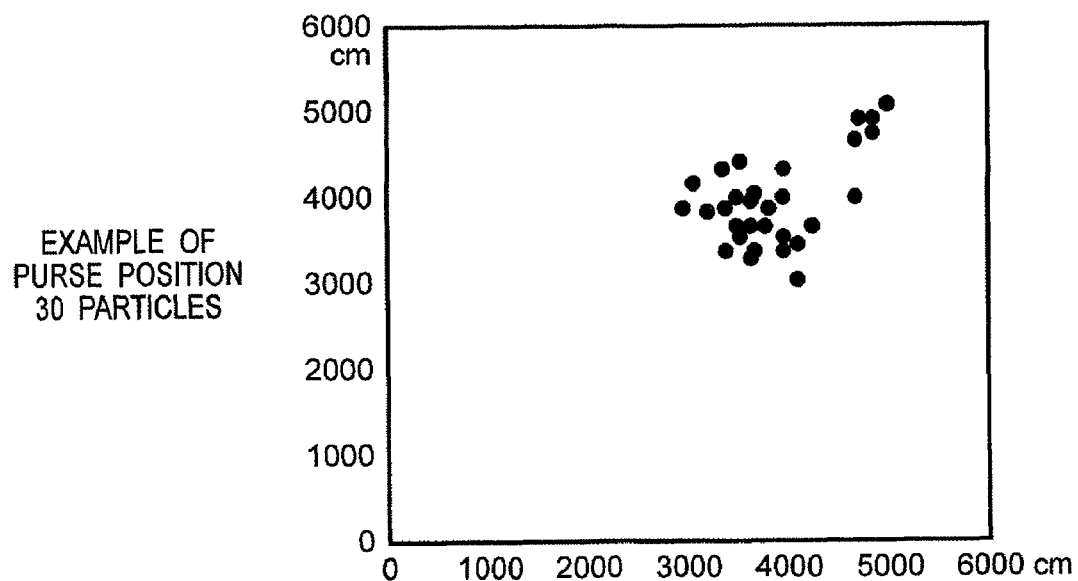
FIG. 14B is a comparison view with respect to approximation precision classified depending on the numbers of particles.

In the case of the object position estimating method by the use of the particle filter, a issue is raised in that, although the greater the number of the particles, the higher the precision of approximation becomes, but the calculation time required for the object position estimating process becomes longer, and in that, although the smaller the number of the particles, the shorter the calculation time required for the object position estimating process becomes shorter, but the precision of approximation becomes lower. FIG. 14A shows an example in which 15 particles are used for carrying out the position estimating process for a purse (one black dot in FIG. 14A corresponds to one particle), and FIG. 14B shows an example in which 30 particles are used for carrying out the position estimating process for a purse. The coordinates of these particles respectively form the position candidates of the object. As shown in FIG. 14A, it is determined that the purse is supposed to be located at coordinates (4000, 4000) near the center of the 15 particles. However, as shown in FIG. 14B, since the number of the particles becomes greater to make the approximation precision higher, it is also determined that there is a probability that the purse is located at coordinates (5000, 5000) except for the coordinates (4000, 4000). These coordinates form the position candidates of the object.

The parameter determination unit 107 determines the number of particles used for processing unprocessed observation data from the current time to the observation raw data processing completion scheduled time, by using the respective pieces of information, such as the observation raw data processing (object identifying process) completion scheduled time, the current time, the processing capability of the object position estimating unit 106, and the present unprocessed observation data.

Additionally, the parameter determination unit 107 is provided with a timer inside thereof, and allowed to acquire time information such as the current time, and the observation raw data processing completion scheduled time is stored in the observation database 105.

In the case where the number of particles determined by the parameter determination unit 107 is greater than the number of particles used, for example, in the previous process, the particles corresponding to the increased portion may be scattered uniformly inside the environment, or may be scattered in accordance with the weights of the respective original particles, by the parameter determination unit 7. In contrast, in the case where the number of particles determined by the parameter determination unit 107 is smaller than the number of the particles used in the previous process, the number of particles corresponding to the reduced portion may be omitted at random from the particle distribution as the result of the previous position estimation, or may be omitted in accordance with the weights of the respective original particles, by the parameter determination unit 107.

Additionally, the parameter determination process (parameter setting process) of the parameter determination unit 107 will be explained below.

The parameter determination unit 107 determines the number of particles to be used for processing an object corresponding to unprocessed observation data, within a time difference between the time at which the object identifying process by the object identifying unit 103 is completed and the current time stored in the observation database 105.

Figures 10, 11A:
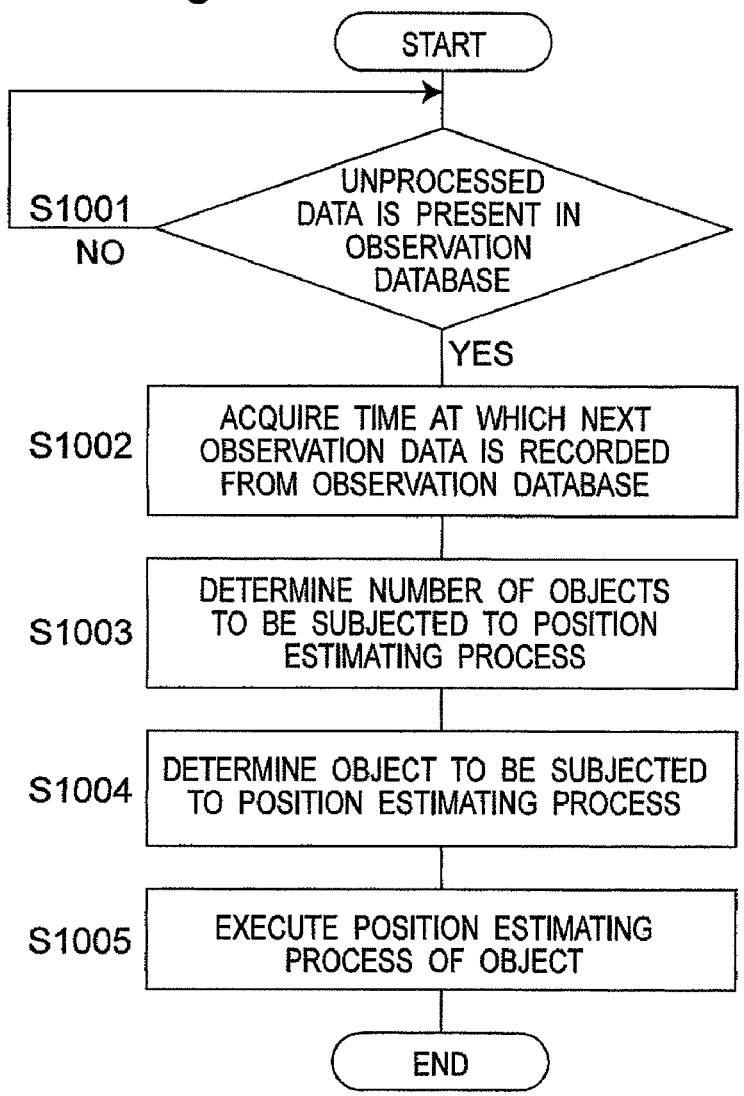
FIG. 10 is a flow chart that shows processes of the object position estimating system in accordance with the first embodiment of the present invention.
FIG. 11A is a view that shows information relating to a relationship between the number of particles and processing time of the object position estimating system in accordance with the first embodiment of the present invention.
Figure 12:
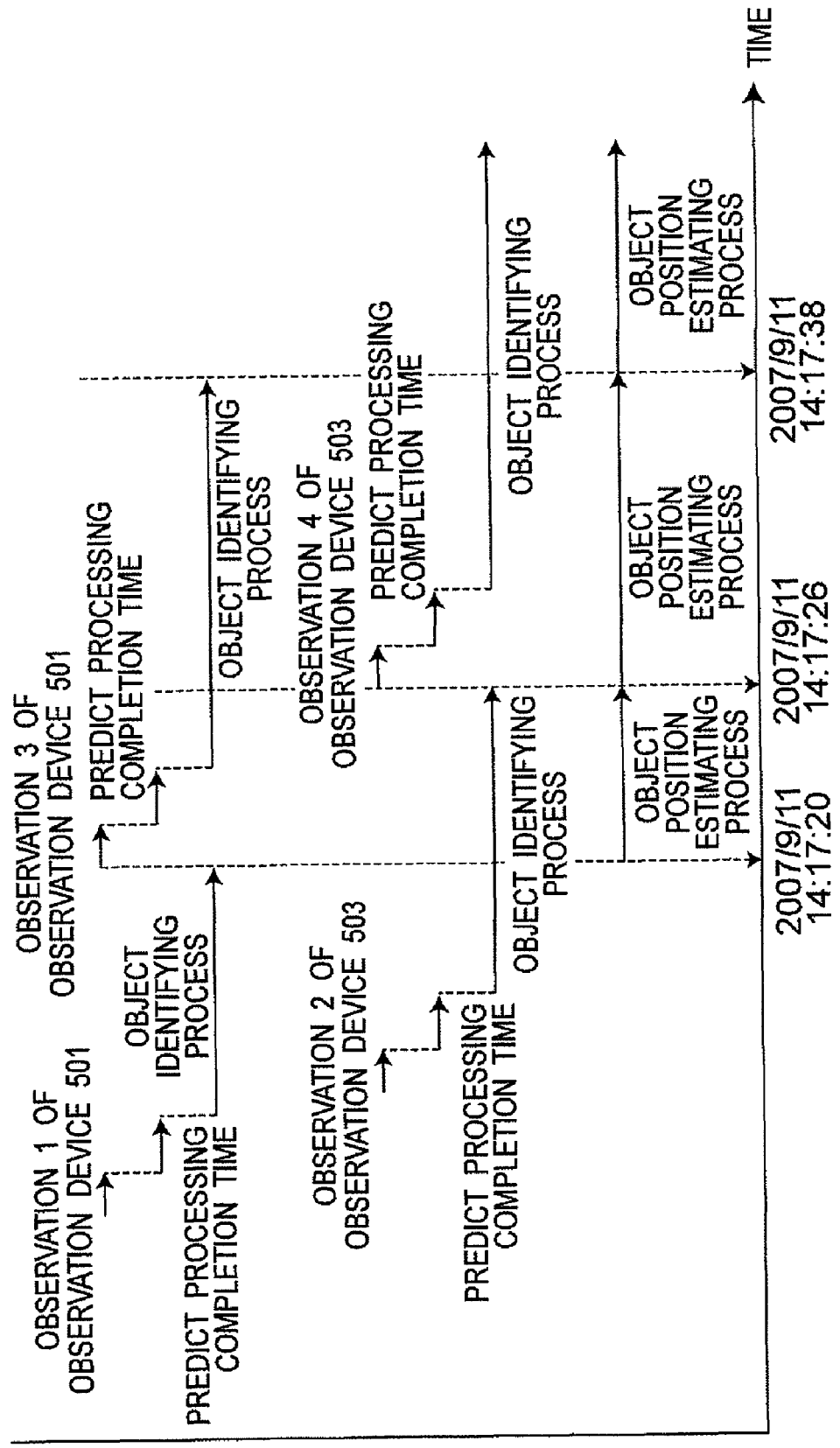
FIG. 12 is a timing chart obtained by simplifying FIG. 11B in accordance with the first embodiment of the present invention.
Figure 13:
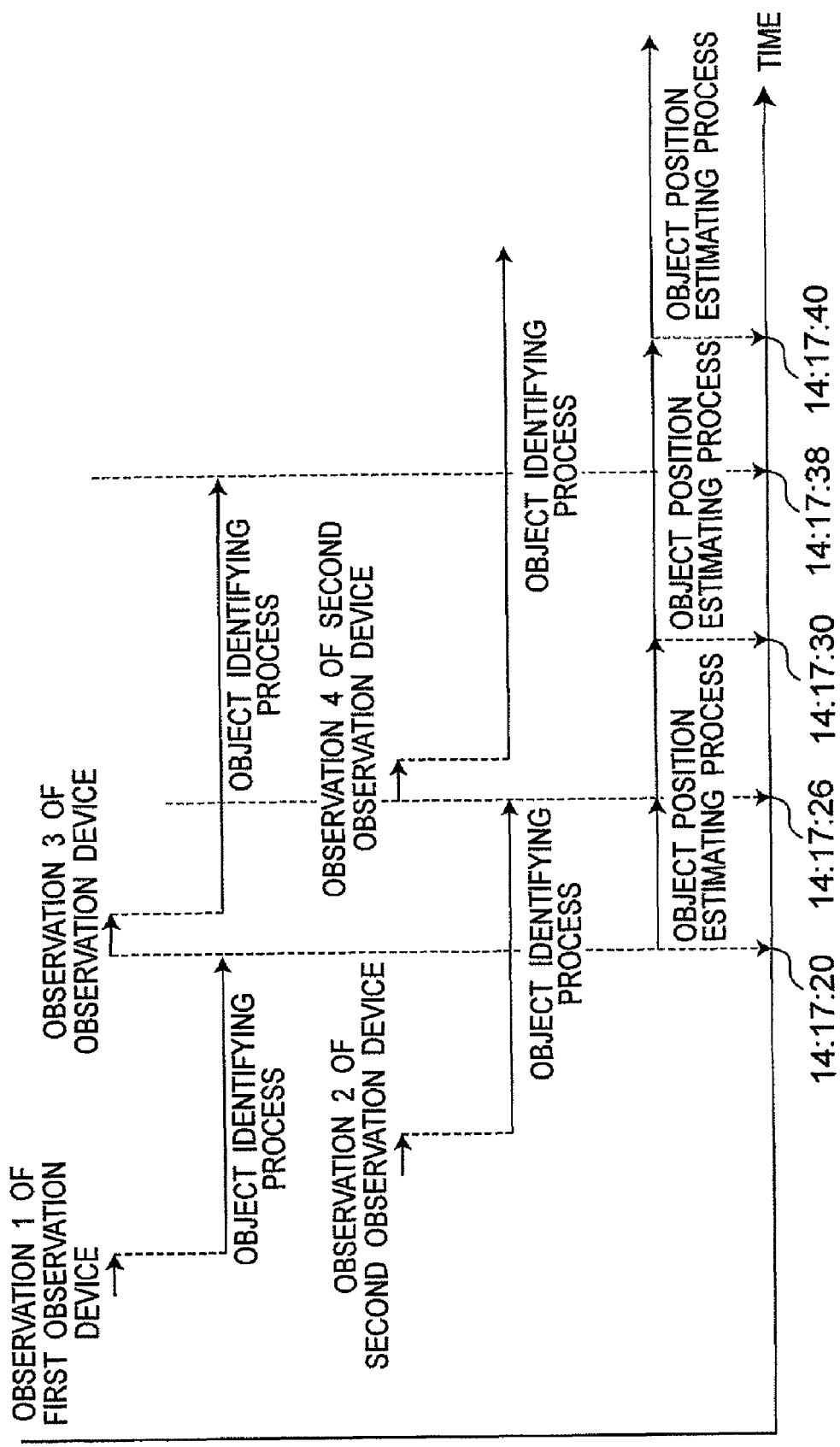
FIG. 13 is a timing chart in which the present invention is not used, in comparison with that of FIG. 12.

In this case, FIG. 11A shows an example information (relational information) showing the relationship between the number of particles and the period of time required for the object identifying process. The relational information is stored, for example, in the inner storage unit of the parameter determination unit 107. FIG. 11A indicates that, for example, when a particle filter is applied with 100 particles being used, a period of time of 0.8 seconds is required for carrying out the position estimation of one object, and successively indicates that, when the particle filter is applied, with 200 particles, 300 particles, 500 particles, or 1000 particles being respectively used, periods of time of 1 second, 2 seconds, seconds, and 5 seconds are respectively required for carrying out the position estimation of one object. Additionally, it is supposed that the relational information shown in FIG. 11A has been preliminarily obtained by preliminary experiments.

The following description will describe a method for determining the number of particles by using the relational information of FIG. 11A, a data sample of the data table ID "TBL_001" of FIG. 5(*a*) and the parameter determination unit 107.

First, the parameter determination unit 107 determines whether or not a point of time at which the observation data is next stored is stored in the observation database 105 of FIG. 5 relative to the present time, and in the case where the parameter determination unit 107 has determined that the point of time at which the observation data is next stored is stored in the observation database 105, the following operations are carried out. For example, as shown in FIG. 5(*a*), at the current time of 17 minutes:20 seconds (in this case, the time, date, and year are omitted for simplicity of explanation), when the information stored in the observation database 105 is referred to, the point of time at which the observation data is next stored is 17 minutes:26 seconds (see FIG. 5(*b*)). The unprocessed observation data at the current time, 17 minutes:20 seconds, are two data, that is, the observation data "Obj_001" relating to the first observation object, obtained by the first observation device 501, and the observation data "Obj_002" relating to the second observation object (see the $2^{nd}$ line of FIG. 5(*a*)), and the process completion predicting unit 104 can calculate the fact that there is a time margin of (current time: 17 minutes:20 seconds)−(next time: 17 minutes:26 seconds)=6 seconds, until the observation data (in this example, the respective observation data of the fourth observation object and the fifth observation object to be acquired by the third observation device 503) has been stored, (that is, until the data table of table ID "TBL_002" of FIG. 5(*b*) has been stored). At this time, since the unprocessed observation data at the present time are data relating to the two objects, the parameter determination unit 107 calculates to find the fact that the processing time to be applied per object is up to 3 seconds from an equation of 6 seconds/2 pieces=3 seconds. Therefore, from the relational information of FIG. 11A, the parameter determination unit 107 can set (determine) so that the number of particles (at a processing speed of 3 seconds per object) that can be processed in 3 seconds per object is 500 pieces.

Therefore, in accordance with the number of observation data to be processed by the object position estimating unit 106 and the period of time up to the next storage of the observation data, the number of particles of the particle filter is set (determined) by the parameter determination unit 107, and by using particles of 500 pieces set by the parameter determination unit 107, the position estimating processes of the two objects can be carried out by the object position estimating unit 106, by using a particle filter. As a result, within a waiting period of time up to the next storage of observation data required for the object position estimating process, the object identifying process of the observation raw data can be completed. In other words, the position estimation of the object can be carried out without a delay for the observation of the observation unit 101.

In contrast, in the case where the parameter determination unit 107 has determined that the point of time at which the observation data is next stored (observation raw data processing completion scheduled time) is not stored in the observation database 105 of FIG. 5, yet, the parameter determination unit 107 determines the number of particles as a reference number of particles preliminarily determined (for example, 200 pieces).

In FIG. 20A showing one example of the observation database, "TBL_004" represents an example of the observation database 105 in which the observation data is recorded under a circumstance where no observation raw data processing completion scheduled time is recorded. In the case of the obtained data shown by "TBL_004", the parameter determination unit 107 determines the number of particles as the reference number of particles preliminarily determined, and estimates the position of the object. In FIG. 20B showing another example of the observation database, "TBL_005" represents an example of the observation database 105 after the estimation of the position of the object by using the above-mentioned data indicated by "TBL_004". In "TBL_005", total five observation data, that is, observation values "Obj_004 (266, 37)" and "Obj_005 (322, 21)", outputted by the observation device 503, and observation values "Obj_002 (119, 28)", "Obj_003 (197, 69)", and "Obj_004 (266, 36)", outputted by the observation device 502, are present as unprocessed observation data. Moreover, the current point of time is 14 o'clock:17 minutes:34 seconds on Sep. 11, 2007, and the point of time at which the next observation data is recorded is 14 o'clock:17 minutes:38 seconds on Sep. 11, 2007. That is, the parameter determination unit 107 determines the number of particles used for processing the 5 pieces of observation data in four seconds up to the next recording of the observation data.

Moreover, not limited to "seconds", the unit of time "until the observation data is next stored" may be represented separately by a plurality of stages (for example, three in this case), that is, for example, respective cases of "much time required", "medium time required", and "little time required", and the relational information between the number of particles and the processing time per object may be prepared in accordance with the respective cases. FIG. 18 shows the relational information between the number of particles and the processing time at this time. In FIG. 18, for example, in the case of "much time required" (in FIG. 18, expressed as "long"), the number of particles is set to 300 pieces, in the case of "medium time required" (in FIG. 18, expressed as "medium"), the number of particles is set to 200 pieces (reference number of particles), and in the case of "little time required" (in FIG. 18, expressed as "short"), the number of particles is set to 100 pieces. Based upon these pieces of relational information, the number of particles may be set by the parameter determination unit 107.

In accordance with the first embodiment, based upon the number of observation data to be processed by the object position estimating unit 106 and the period of time up to the next storage of the observation data, the number of particles can be altered by the parameter determination unit 107. That is, as the reference or initial setting, the relational information between the processable time of the observation raw data from the present time to the next storage time of the observation data and the number of processable particles during the processable time of the observation raw data is preliminarily stored in the inner storage unit of the parameter determination unit 107. Then, in the case where the processable time of the observation raw data from the present time to the next storage time of the observation data is shorter than a predetermined period of time, the number of particles is reduced from the number of particles corresponding to the predetermined period of time by the parameter determination unit 107 so that the period of time required for the object identifying process is reduced, while, in the case where the processable time of the observation raw data from the present time to the next storage time of the observation data is longer than the predetermined period of time, the number of particles is increased from the predetermined number of particles by the particle determination unit 107 so that the position of the object can be estimated with higher precision. Consequently, within the waiting period of time up to the next storage of the observation data required for the object position estimating process, the object identifying process of the observation raw data can be positively completed.

Second Embodiment

FIG. 1 is also a block diagram that shows an object position estimating system in accordance with a second embodiment of the present invention. In other words, the schematic structure of the object position estimating system in accordance with the second embodiment is the same as the object position estimating system in accordance with the first embodiment, and as will be described later, only the functions of the object position estimating unit 106 and the parameter determination unit 107 are different from each other.

The present system is configured by observation unit 101, an object database 102, object identifying unit 103, process completion time predicting unit 104, observation database 105, object position estimating unit 106 and parameter determination unit 107.

The respective unit other than the object position estimating unit 106 and the parameter determination unit 107, as well as the respective databases, have the same functions as those explained in the first embodiment; therefore, the explanations thereof will be omitted.

As the object position estimating unit 106, for example, a Kalman filter or the like may be used in place of the particle filter. The Kalman filter is a filter by which, in the case where noise is contained in information of a system state (in the second embodiment of the present invention, for example, an object position), with noise being also contained in the observation value, a state having the highest probability can be estimated among candidates of the state that are available in the system. FIG. 6B shows an example in which the Kalman filter is utilized for the object position estimating process. The axis of ordinates represents the probability and the axis of abscissas represents the position.

When an object is shifted in such a manner as to be indicated by the following (equation 1), the observation unit 101 can obtain an observation value 603 found by the following (equation 2). In this case, A represents a moving model of an object, x represents an object position, and v represents process noise that is generated upon movement. Moreover, y represents an observation value, H represents an observation model that makes the object position x and the observation value y in association with each other, w represents observation noise, and t represents time.

$$x_t = A_t x_{t-1} + v_t \quad \text{[Equation 1]}$$

$$y_t = H_t x_t + w_t \quad \text{[Equation 2]}$$

In this case, suppose that process noise v and observation noise w are defined as white Gauss noise, p(w) is represented by formula (3) and p(v) is represented by formula (4). Additionally, N(0, Q) represents a Gaussian distribution with an average of 0 and a distribution of Q. N(0, R) also represents a Gaussian distribution with an average of 0 and a distribution of R.

$$p(w) \sim N(0, Q) \quad \text{[Formula 3]}$$

$$p(v) \sim N(0, R) \quad \text{[Formula 4]}$$

When an observation value 603 is obtained, a preliminary possibility distribution 601 (hereinafter, referred to as "preliminary distribution") relating to the position of the object currently obtained is updated by the object position estimating unit 106 so that a predicted distribution 602 is formed by the object position estimating unit 106. The position of the predicted distribution 602 can be found by the formula of (formula 5), and the dispersion of the predicted distribution 602 can be found by the formula of (formula 6), by the object position estimating unit 106. In this case, "$X_{a|b}$" represents an estimated value of X at a point of time "a" based upon the information at a point of time "b". For example, "$x_{t|t-1}$" of (formula 5) represents an estimated value of the object position x at time t obtained based upon the information at time t−1, and "$P_{t|t-1}$" of (formula 6) represents an estimated value of P at time t obtained based upon the information at a point of time t−1. In this case, P indicates the dispersion of the distribution.

$$x_{t|t-1} = A_t x_{t-1|t-1} \quad \text{[Equation 5]}$$

$$P_{t|t-1} = A_t P_{t-1|t-1} A_t^T + Q_t \quad \text{[Equation 6]}$$

When the predicted distribution 602 is obtained by the object position estimating unit 106, a posterior distribution 604 is found by the object position estimating unit 106 from the observation value 603 and the predicted distribution 602. The position of the posterior distribution 604 is found by the object position estimating unit 106 from (equation 7), and the dispersion of the posterior distribution 604 is found by the object position estimating unit 106 from (equation 8). In this case, K represents a value referred to as a Kalman gain, which is obtained by (equation 9). The Kalman gain is a value used for determining the amount of updating. In the case where the precision of the observation value is superior (dispersion R is very small), the value of the Kalman gain is increased so as to increase the amount of updating. In contrast, in the case where the precision of the posterior distribution is superior (P is very small), the value of the Kalman gain is reduced so as to reduce the amount of updating.

$$x_{t|t} = x_{t|t-1} + K_t(y_t - H_t x_{t|t-1})$$ [Equation 7]

$$P_{t|5} = (1 - K_t H_t) P_{t|t-1}$$ [Equation 8]

$$K_t = P_{t|t-1} H_t^T (H_t P_{t|t-1} H_t^T + R_t)^{-1}$$ [Equation 9]

By using respective pieces of information relating to the observation raw data processing completion scheduled time, the current time, the processing capability of the object position estimating unit 106 and currently unprocessed observation data, the parameter determination unit 107 estimates how many objects can be subjected to unprocessed observation data processing operations thereof, from the current time to the observation raw data processing completion scheduled time.

More specifically, referring to the data table having the data table ID "TBL_001" of FIG. 5(a), the explanation will be given as follows: For example, at the current time of 17 minutes:20 seconds (in this case, the time, date, and year are omitted for simplicity of explanation), the point of time at which the next observation data is stored is set to 17 minutes: 26 seconds (see FIG. 5(b)). In the same manner as in the first embodiment, the unprocessed observation data at the current time, 17 minutes:20 seconds, are two data, that is, the observation data "Obj_001" relating to the first observation object, obtained by the first observation device 501, and the observation data "Obj_002" relating to the second observation object (see the $2^{nd}$ line of FIG. 5(a)), and the parameter determination unit 107 can calculate the fact that there is a time margin of (current time: 17 minutes:20 seconds)−(next time: 17 minutes:26 seconds)=6 seconds, until the observation data (in this example, the respective observation data of the fourth observation object and the fifth observation object to be acquired by the third observation device 503) have been stored (that is, until the data table having a data table ID "TBL_002" has been stored).

At this time, supposing that it takes 3 seconds per object for the object position estimating unit 106 to process the object, since there is a time margin of 6 seconds, until the next observation data is stored, that is, since 6 seconds/2 seconds=2 pieces, the positions of two pieces of objects can be estimated so that all the observation data corresponding to two pieces of objects observed by the observation unit 101 of the observation device 501 having the first observation device ID "501" can be processed. However, supposing that it takes 5 seconds per object for the object position estimating unit 106 to process the object, since only the time margin of 6 seconds is left prior to the next storage of the observation data, that is, since 6 seconds/5 seconds=1.2 pieces, the position of only one object can be estimated. In this case, it becomes necessary for the object position estimating unit 106 to select which object position of two objects (Obj_001, Obj_002) observed by the observation unit 101 of the observation device 501 having the observation device ID "501" should be estimated.

Figure 7:
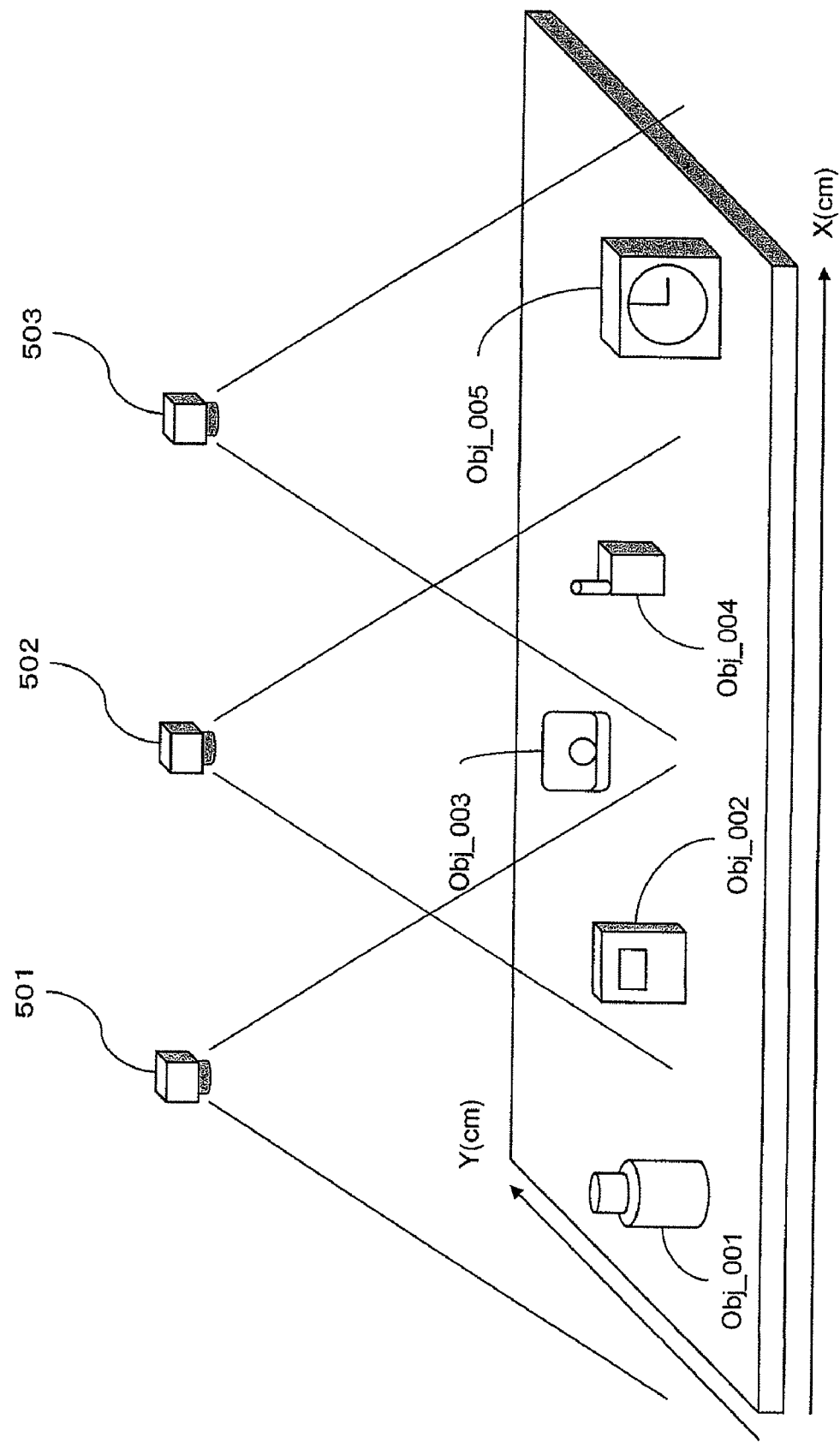
FIG. 7 is a view that shows an example of an object observation state of the object position estimating system in accordance with the first and second embodiments of the present invention.

Referring to FIGS. 6B and 7, the following description will describe the selection method of an object by which a position estimating process is carried out among a plurality of objects by the object position estimating unit 106.

Figure 8:
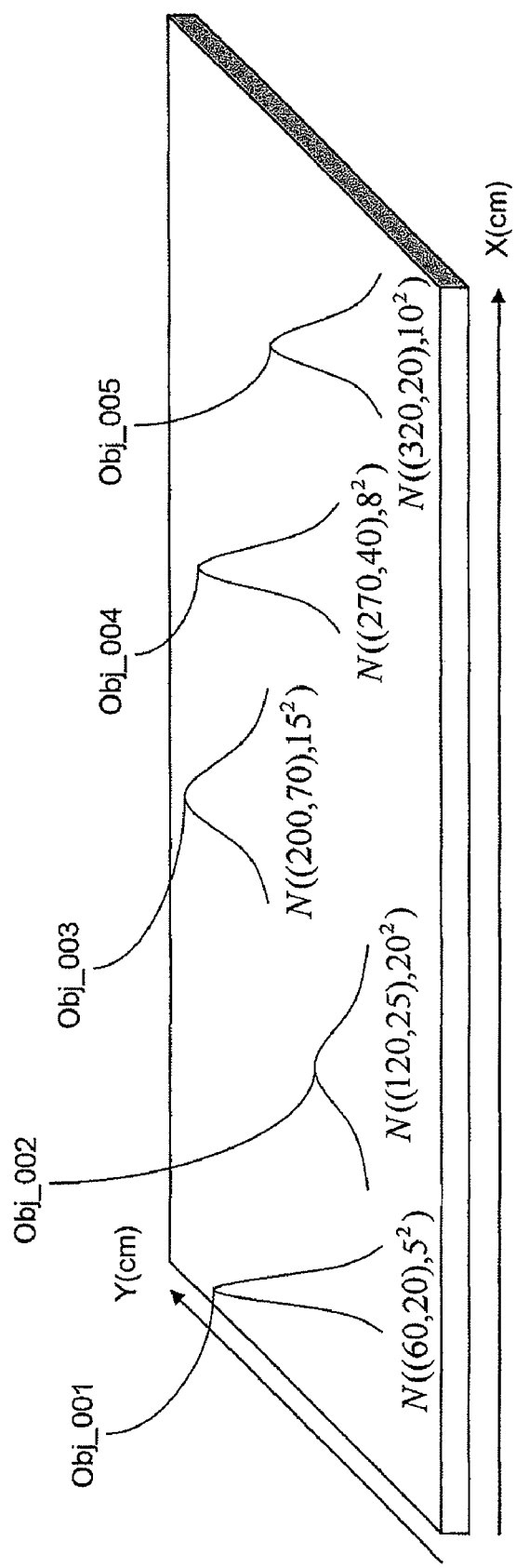
FIG. 8 is a view that shows one example of the object position estimation results in accordance with the first embodiment of the present invention.

FIG. 7 shows a state in which five objects located within an environment are observed by using three observation devices 501, 502, and 503, and FIG. 8 shows estimated positions of the respective objects immediately before the processing of the observation data of the first observation device ID "501" at the point of time when the data table of the data table ID "TBL_001" is obtained (for example, in the case where a Kalman filter is used as the object position estimating unit 106, the preliminary distribution, obtained after the moving model has been taken into consideration, may be used). The respective observation devices 501, 502, and 503 are cameras or range-measuring sensors.

FIG. 8 shows an example of an estimated state of the object positions. FIG. 8 indicates a probability distribution relating to each of the positions of the respective objects, and, for example, with respect to the first observation object of the object ID "Obj_001", it shows an average position (position coordinates) of (x, y)=(60, 20) and a distributed covariance matrix of $(5^2, 0, 0, 5^2)$. With respect to the second observation object of the object ID "Obj_002", FIG. 8 shows an average position (position coordinates) of (x, y)=(120, 25) and a distributed covariance matrix of $(20^2, 0, 0, 20^2)$.

For example, in the case where only one object whose position is to be estimated is selected from the two observation objects, that is, the object IDs of "Obj_001" and "Obj_002" by the object position estimating unit 106, the position of the object having a greater distribution in the dispersion is estimated and selected by the object position estimating unit 106. In this case, since the dispersion covariance matrix of the first observation object is $(5^2, 0, 0, 5^2)$, and since the dispersion covariance matrix of the second measurement object is $(20^2, 0, 0, 20^2)$, the dispersion of the distribution of the second observation object with the object ID "Obj_002" is greater than the dispersion of the distribution of the first observation object with the object ID "Obj_001", the parameter determination unit 107 determines that the position of the object with the object ID "Obj_002" should be estimated by the object position estimating unit 106. Thus, estimating processes can be carried out in succession starting from an object whose position is vaguely estimated so that it is possible to eliminate a biased state with respect to the position estimation precision of all the objects.

Moreover, in an attempt to select the object whose position is to be estimated by the object position estimating unit 106, not based upon dispersion, but based upon comparisons with distances between the center position of distribution and the observation position made by the object position estimating unit 106, the object position estimating unit 106 may be allowed to make the selection. For example, the center position (position coordinates) of the distribution of the first observation object with the object ID "Obj_001" is (60, 20), and the observation position (position coordinates) of the observation unit 101 of the first observation device 501 is (65, 20), with difference being 5 cm between them. On the other hand, suppose that the center position (position coordinates) of the distribution of the second observation object with the object ID "Obj_002" is (120, 25), and that the observation position (position coordinates) of the observation unit 101 of the second observation device 502 is (120, 26), with a difference being only 1 cm between them. In this case, the object position estimating unit 106 determines that, when the difference between the center position of distribution and the observation position is large, the position with the object ID "Obj_001" is estimated by the object position estimating unit 106. With this arrangement, position estimating processes can be carried out by the object position estimating unit 106 in succession, starting from an object whose position is vaguely estimated so that it is possible to eliminate a biased state with respect to the position estimation precision of all the objects. After the object position estimating processes by the object position estimating unit 106, both of the object with the object ID "Obj_001" and the object with the object ID "Obj_002" are classified as processed observation data. The determination by the object position estimating unit 106 as to whether the processed observation data or not may be made based upon observation data that has been processed by the parameter determination unit 107 and stored in the observation database 105, or may be made based upon information indicating the processed state preliminarily stored in the observation database 105 by the object position estimating unit 106, which is read by the object position estimating unit 106 later. In these cases, in FIG. 1, the flow of data (information) from the parameter determination unit 107 to the observation database 105, or the flow of data (information) from the object position estimating unit 106 to the observation database 105, is added thereto.

Moreover, upon selecting an object whose position is estimated by the object position estimating unit 106, a matching score may be utilized. In the case where the matching score is low, this indicates that there are many places where no matching is made between the detected differential area and the template image, there is a possibility of erroneous identification of the object ID. In other words, when the position estimating process is carried out by using data relating to an object ID having a low matching score, the result of the position estimation might become incorrect. Therefore, by estimating positions of objects in the order of object IDs having a higher score, it is possible to avoid erroneous position estimations. For example, suppose that, of the first data "Ob_001 (65, 20) and the second data "Ob_002 (120, 26)" of FIG. 26, only the time required for carrying out one of the objects is left. In this case, since the matching score (0.8) of the "Ob_001" is higher than the matching score (0.6) of the "Ob_002", the position estimating process of "Ob_001" is carried out by the object position estimating unit 106.

Figure 9:
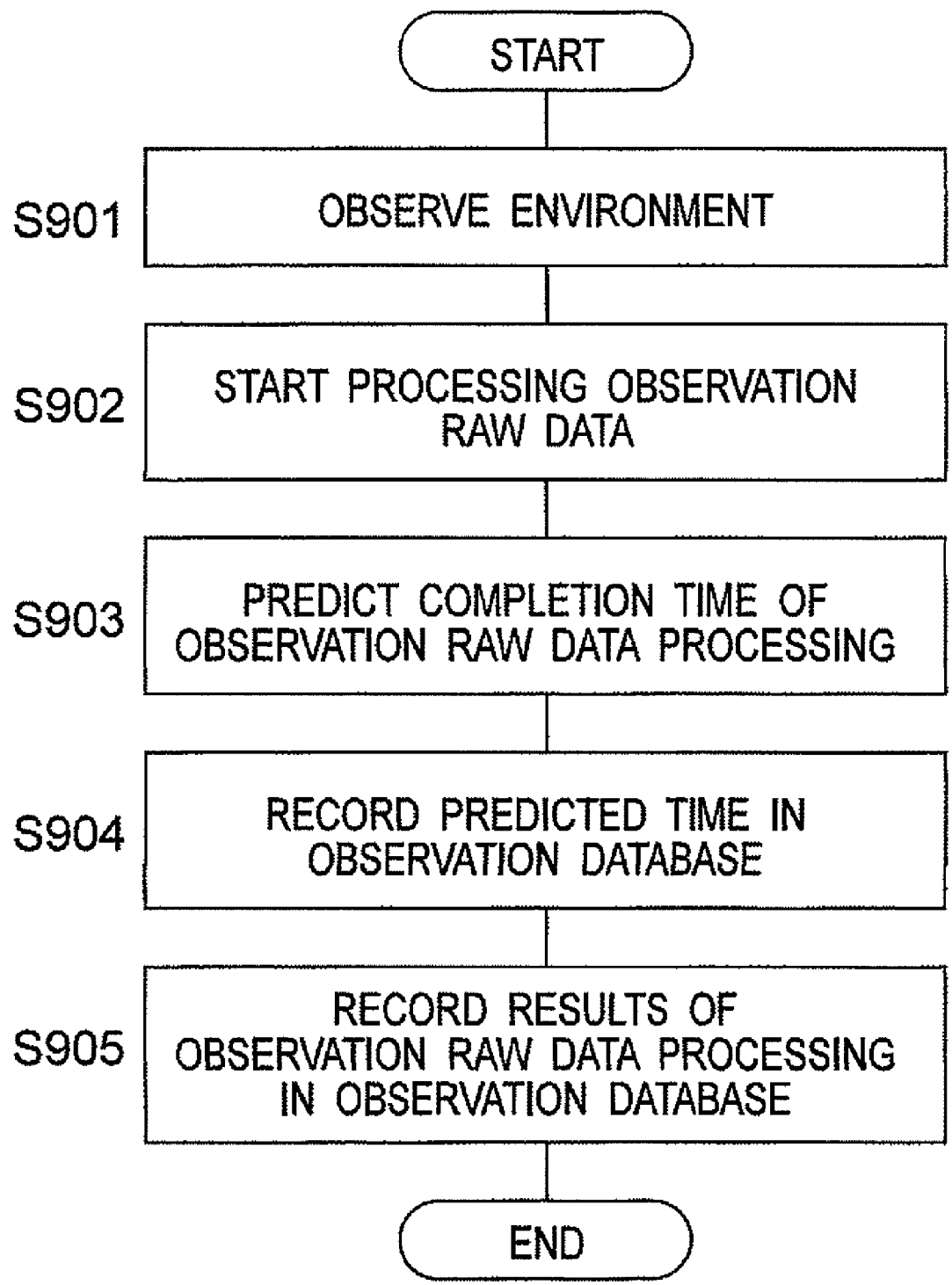
FIG. 9 is a flow chart that shows processes of the object position estimating system in accordance with the first embodiment of the present invention.

Next, referring to flow charts shown in FIGS. 9 and 10, the following description will describe processes of the object position estimating system. FIG. 9 shows a flow chart of the observation operations in the observation unit of the respective observation devices 500, the object identifying processes in the object identifying unit 103 and the process completion time predicting process in the process completion time predicting unit 104, and FIG. 10 shows a flow chart of the object position estimating process in the object position estimating unit 106.

First, the flow chart of the observation operations and the like of the observation device 500 of FIG. 9 will be explained.

In step S901, a sensor that is one example of the observation unit 101 installed in the observation device 500 observes the environment, and acquires observation raw data.

In step S902, the object identifying unit 103 starts an object identifying process of the observation raw data acquired by the sensor.

Next, in step S903, the process completion time predicting unit 104 predicts the completion predicting time of the object identifying process based upon the contents of the object identifying process of the observation raw data carried out by the object identifying unit 103.

Next, in step S904, the process completion time predicting unit 104 stores the object identifying process completion scheduled time of the observation raw data predicted in step S903 in the observation database 105.

Next, in step S905, immediately after the completion of the object identifying process of the observation raw data, the object identifying unit 103 stores observation data relating to the ID and position of the object in the observation database 105.

The following description will describe the flow chart relating to the object position estimating process of FIG. 10.

In step S1001, the parameter determination unit 107 determines whether or not unprocessed observation data is present in the observation database 105. In the case where the parameter determination unit has determined that no unprocessed observation data is present in the observation database 105, this step S1001 is repeated until unprocessed observation data has been given thereto. In the case where the parameter determination unit has determined that unprocessed observation data is present in the observation database 105, the sequence proceeds to step S1002.

Next, in step S1002, the parameter determination unit 107 acquires a point of time at which the observation data relating to the ID and position of the next object are stored, from the observation database 105.

Next, in step S1003, based upon a time difference between the point of time acquired in step S1002 and the current time acquired from the inner timer of the parameter determination unit 107 and the processing speed of the object position estimating unit 106, the parameter determination unit 107 determines the number of observed objects on which the object position estimating process can be carried out.

Next, in step S1004, based upon the object estimated positions of the respective objects obtained at this point of time, the parameter determination unit 107 determines the objects corresponding to the number of the observed objects determined in step S1003 as observed objects on which the position estimating process is carried out, in the order of those objects having a greater difference between the estimated position and the observed position.

Next, in step S1005, with respect to the observed objects determined by the parameter determination unit 107 as observed objects to be subjected to the position estimating process, the object position estimating unit 106 carries out the object position estimating process, based upon the observation data relating to the ID and the position of the object stored in the observation database 105.

FIG. 11B shows a timing chart at the time when the position of an object is estimated based upon the observation data and the observation raw data processing completion scheduled time shown in FIG. 5. Additionally, for simplicity of explanation, the process relating to the second observation device 502 is omitted from FIG. 11B, and in the following explanation also, the description of the second observation device 502 will be omitted.

As shown in FIG. 5, at the time of 14:17':20" (14 o'clock: 17 minutes:20 seconds)(in this case, the date, month, and year are omitted for simplicity of explanation), "Obj_001 (65, 20)" and "Obj_002 (120, 26)" are stored in the observation database 105, as observation data as a result of the object identifying process of the observation raw data acquired by the first observation device 501, the parameter determination unit 107 refers to the observation raw data processing completion scheduled time stored in the observation database 105, and acquires the data. Moreover, at the same time, 14:17':20", as shown in FIG. 5, since the observation raw data processing completion scheduled time 14:17':26" of the third observation device 503 is stored in the observation database 105, there is a time margin of 6 seconds to be used for an object position estimating process until the fourth observation data "Obj_004 (266, 37)" and the fifth observation data "Obj_005 (322, 21)" of the third observation device 503 have been next stored. At this time, in the case where the position of one object can be estimated within 3 seconds, by using the two observation data "Obj_001 (65, 20)" and "Obj_002 (120, 26)", the positions of two objects having the object ID "Obj_001" and the object ID "Obj_002" can be processed and estimated by the object position estimating process unit 106. However, in the case where it takes 3 seconds or more to estimate the position of one object, by using either the data "Obj_001 (65, 20)" or the data "Obj_002 (120, 26)", the position of one object is processed and estimated by the object position estimating process unit 106. Since the determination as to which data to be used has already been explained, the description thereof will be omitted.

In the case where, as a result of the reference to the observation raw data processing completion scheduled time by the parameter determination unit 107, the parameter determination unit 107 determines that no observation raw data processing completion scheduled time is stored, for example, by using the two data "Obj_001 (65, 20)" and "Obj_002 (120, 26)", the object position estimating process is carried out. Thereafter, the same process is repeated so that the position estimating processes of objects are carried out.

The following description will describe a timing chart in FIG. 11B in detail.

In this example shown in FIG. 11B, observation raw data of the first observation object and the second observation object are respectively acquired by the observation unit 101 of the first observation device 501 (see process $P_1$ of FIG. 11B) up to the current time 14 o'clock:17 minutes:20 seconds (in this case, date, month, and year are omitted for simplicity of explanation), and a sum of periods of time (observation raw data processing completion scheduled time) required for the object identifying unit 103 to process the observation raw data is calculated by the process completion time predicting unit 104, and the resulting period of time is stored in the observation database 105 (see process $P_2$ of FIG. 11B) together with the ID "501" of the first observation device 501 as the observation raw data processing completion scheduled time in the observation database 105. Next, by using the observation raw data obtained in the first observation device 501, the object identifying unit 103 starts an object identifying process, and when the observation data are obtained after completion of the object identifying process of the observation raw data, the observation data thereof "Obj_001 (65, 20)" and "Obj_002 (120, 26)" are stored in the observation database 105 together with the ID "501" of the first observation device 501 (see the $2^{nd}$ line of FIG. 5(a) and process $P_3$ of FIG. 11B). The completion time of this process $P_3$ corresponds to the current time 14 o'clock:17 minutes:20 seconds.

At this time, in parallel with processes $P_1$ to $P_3$, observation raw data of the fourth observation object and the fifth observation object are respectively acquired by the observation unit 101 of the third observation device 503 (see process $P_4$ of FIG. 11B) up to the current time 14 o'clock:17 minutes:20 seconds, and a sum of periods of time (observation raw data processing completion scheduled time) required for the object identifying unit 103 to process the observation raw data is calculated by the process completion time predicting unit 104, and the resulting period of time is stored in the observation database 105 together with the ID "503" of the third observation device 503 as the observation raw data processing completion scheduled time (see "14 o'clock:17 minutes:26 seconds" in the third line of FIG. 5(a) and process $P_5$ of FIG. 11B). Next, by using the observation raw data obtained in the third observation device 503, the object identifying unit 103 starts an object identifying process (see process $P_6$ of FIG. 11B). This process $P_6$ is continued even after the process $P_3$ has been completed (in other words, even after the current time 14 o'clock:17 minutes:20 seconds), and when the object identifying process of the observation raw data has been completed to obtain the observation data, the corresponding observation data "Obj_004 (266, 37)" and "Obj_005 (322, 21)" are stored in the observation database 105 together with the ID "503" of the third observation device 503 (see the fifth line of FIG. 5 and process $P_6$ of FIG. 11B). The completion time of this process $P_6$ corresponds to the current time 14 o'clock:17 minutes:26 seconds.

In this manner, as shown in FIG. 5(a), up to the current time 14 o'clock:17 minutes:26 seconds, the observation data of the first observation object and the observation of the second observation object are stored in the observation database 105 together with the ID "501" of the first observation device 501, and the observation raw data completion scheduled time relating to the third observation device 503 is simultaneously stored in the observation database 105.

Thus, the parameter determination unit 107 refers to the observation raw data processing completion scheduled time relating to the third observation device 503 shown in the data table of FIG. 5(a), and calculates a period of time from the current time to the observation raw data processing completion scheduled time {(14 o'clock:17 minutes:26 seconds)–(14 o'clock:17 minutes:20 seconds)=6 seconds} so that this calculated time corresponds to a period of time in which the object position estimating process is carried out. At this time, in the case where the position of one object can be estimated within 3 seconds, by using the two observation data "Obj_001 (65, 20)" and "Obj_002 (120, 26)", the positions of two objects having the object ID "Obj_001" and the object ID "Obj_002" can be processed and estimated by the object position estimating process unit 106 (see process $P_{21}$ in FIG. 11B). However, in the case where it takes 3 seconds or more to estimate the position of one object, by using either the data "Obj_001 (65, 20)" or the data "Obj_002 (120, 26)", the position of one object is processed and estimated by the object position estimating process unit 106 (see process $P_{21}$ in FIG. 11B). Since the determination as to which data to be used has already been explained, the description thereof will be omitted.

At the current time 14 o'clock:17 minutes:20 seconds and thereafter, since the object identifying process in the first observation device 501 has been completed, another observation object is subjected to an observing operation by the first observation device 501. That is, observation raw data of the third observation object and the fourth observation object are respectively acquired by the observation unit 101 of the first observation device 501 (see process $P_7$ in FIG. 11B), and a sum of periods of time (observation raw data processing completion scheduled time) required for the object identifying unit 103 to process the observation raw data is calculated by the process completion time predicting unit 104, and the resulting period of time is stored in the observation database 105 together with the ID "501" of the first observation device 501 as the observation raw data processing completion scheduled time) in the observation database 105 (see "14 o'clock:17 minutes:38 seconds" in the lowest line of FIG. 5(b) and process $P_8$ of FIG. 11B). Next, by using the observation raw data obtained in the first observation device 501, the object identifying unit 103 starts an object identifying process, and when the observation data are obtained after completion of the object identifying process of the observation raw data, the observation data thereof are stored in the observation database 105 together with the ID "501" of the first observation device 501 (see process $P_9$ of FIG. 11B). The completion time of this process $P_9$ corresponds to the current time 14 o'clock:17 minutes:38 seconds.

At the time of 14 o'clock:17 minutes:20 seconds, since the object position estimating process $P_{21}$ of each of the first observation object and the second observation object or either the first observation object or the second observation object is completed, the parameter determination unit 107 successively refers to the observation raw data processing completion scheduled time relating to the first observation device 501 shown in the data table of FIG. 5(*b*), and calculates a period of time from 14 o'clock:17 minutes:26 seconds to the observation raw data processing completion scheduled time {(14 o'clock:17 minutes:38 seconds)–(14 o'clock:17 minutes:26 seconds)=8 seconds} so that this calculated time corresponds to a period of time in which the object position estimating process is carried out. At this time, in the case where the position of one object can be estimated within 4 seconds, by using the two observation data "Obj_004 (266, 37)" and "Obj_005 (322, 21)", the positions of two objects having the object ID "Obj_004" and the object ID "Obj_005" can be processed and estimated by the object position estimating process unit 106 (see process $P_{22}$ in FIG. 11B). However, in the case where it takes 4 seconds or more to estimate the position of one object, by using either the data "Obj_004 (266, 37)" or the data "Obj_005 (322, 21)", the position of one object is processed and estimated by the object position estimating process unit 106 (see process $P_{22}$ in FIG. 11B). Since the determination as to which data to be used has already been explained, the description thereof will be omitted.

At the time 14 o'clock:17 minutes:26 seconds and thereafter, since the object identifying process in the third observation device 503 has been completed, another observation object is subjected to an observing operation by the third observation device 503. That is, observation raw data of the first observation object and the second observation object are respectively acquired by the observation unit 101 of the third observation device 503 (see process $P_{10}$ in FIG. 11B) simultaneously with the process $P_9$, and a sum of periods of time (observation raw data processing completion scheduled time) required for the object identifying unit 103 to respectively process the observation raw data is calculated by the process completion time predicting unit 104, and the resulting period of time is stored in the observation database 105 together with the ID "503" of the third observation device 503 as the observation raw data processing completion scheduled time in the observation database 105 (see "14 o'clock:17 minutes:38 seconds" in the lowest line of FIG. 5(*c*) and process $P_{11}$ of FIG. 11B). Next, by using the observation raw data obtained in the third observation device 503, the object identifying unit 103 starts an object identifying process (see process $P_{12}$ of FIG. 11B). This process $P_{12}$ is continued even after the process $P_9$ has been completed (in other words, even after the time 14 o'clock:17 minutes:38 seconds), and when the object identifying process of the observation raw data has been completed to obtain the observation data, the corresponding observation data is stored in the observation database 105 together with the ID "503" of the third observation device 503 (see process $P_{12}$ of FIG. 11B).

Thereafter, at the time of 14 o'clock:17 minutes:38 seconds, since the object position estimating process $P_{22}$ of each of the fourth observation object and the fifth observation object or either the fourth observation object or the fifth observation object is completed, the parameter determination unit 107 successively calculates a period of time from 14 o'clock:17 minutes:38 seconds to the observation raw data processing completion scheduled time so that this calculated time corresponds to a period of time in which the object position estimating process is carried out on the observation data acquired in process $P_9$ (see process $P_{23}$ in FIG. 11B).

In accordance with the second embodiment, based upon the number of objects that can be processed within a waiting period of time up to the storage of the next observation data required for an object position estimating process, objects to be subjected to the object position estimating process are determined so that it becomes possible to provide an object position estimating system that can carry out object position estimating processes as many as possible, within a limited period of time.

Third Embodiment

Figure 21:
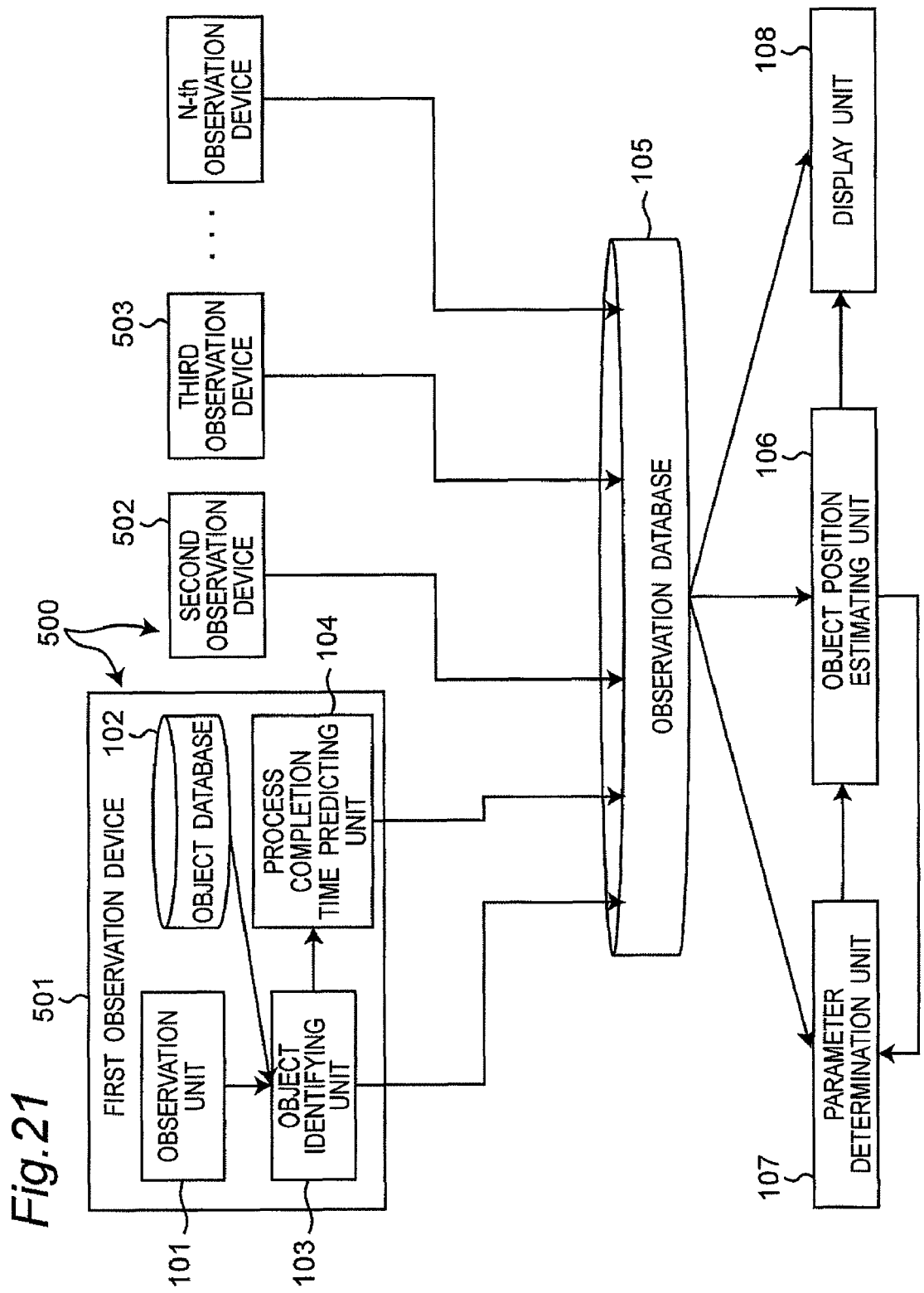
FIG. 21 is a block diagram that shows a structure of an object position estimating system in accordance with a third embodiment of the present invention.

FIG. 21 is a block diagram that shows an object position estimating system in accordance with a third embodiment of the present invention.

The present system is configured by observation unit 101, object database 102, object identifying unit 103, process completion time predicting unit 104, observation database 105, object position estimating unit 106, parameter determination unit 107 and display unit 108.

The respective unit and respective databases other than the display unit 108 have the same functions as those explained in the second embodiment; therefore, the explanations thereof will be omitted.

The display unit 108 receives the estimation result of an object position of the object position estimating unit 106, and displays the result of the estimation. For example, a monitor or the like may be used as one example of the display unit.

Moreover, the display unit 108 refers to the observation database 105, and can display a point of time at which observation data used for outputting the estimated position of an object that is currently estimated, as the previously estimated time. In FIG. 25, "TBL_006" shows on example of an observation database 105 that can record point of time at which the observation device 101 carried out an observation. For example, in the case where the object position estimating process is carried out by using observation data "Obj_004 (266, 37)", and "Obj_005 (322, 21)" of the observation device ID 503, it is found from the previous data of the observation device ID503 that the point of time at which the observation data is obtained is the time 14 o'clock:17 minutes:15 seconds on Sep. 11, 2007.

Moreover, the display unit 108 refers to the observation database 105, and displays the completion scheduled time of the next object identifying process as an output time as a result of the object position estimation of the object position estimating unit 106 of the next time. In the case where the present state is given as "TBL_006" of FIG. 25, the next completion scheduled time of the object identifying process is the time 14 o'clock:17 minutes:34 seconds on Sep. 11, 2007; therefore, the display unit 108 displays the next output time of the result of the object position estimation as the time 14(o'clock):17 minutes:34 seconds on Sep. 11, 2007.

Figure 22:
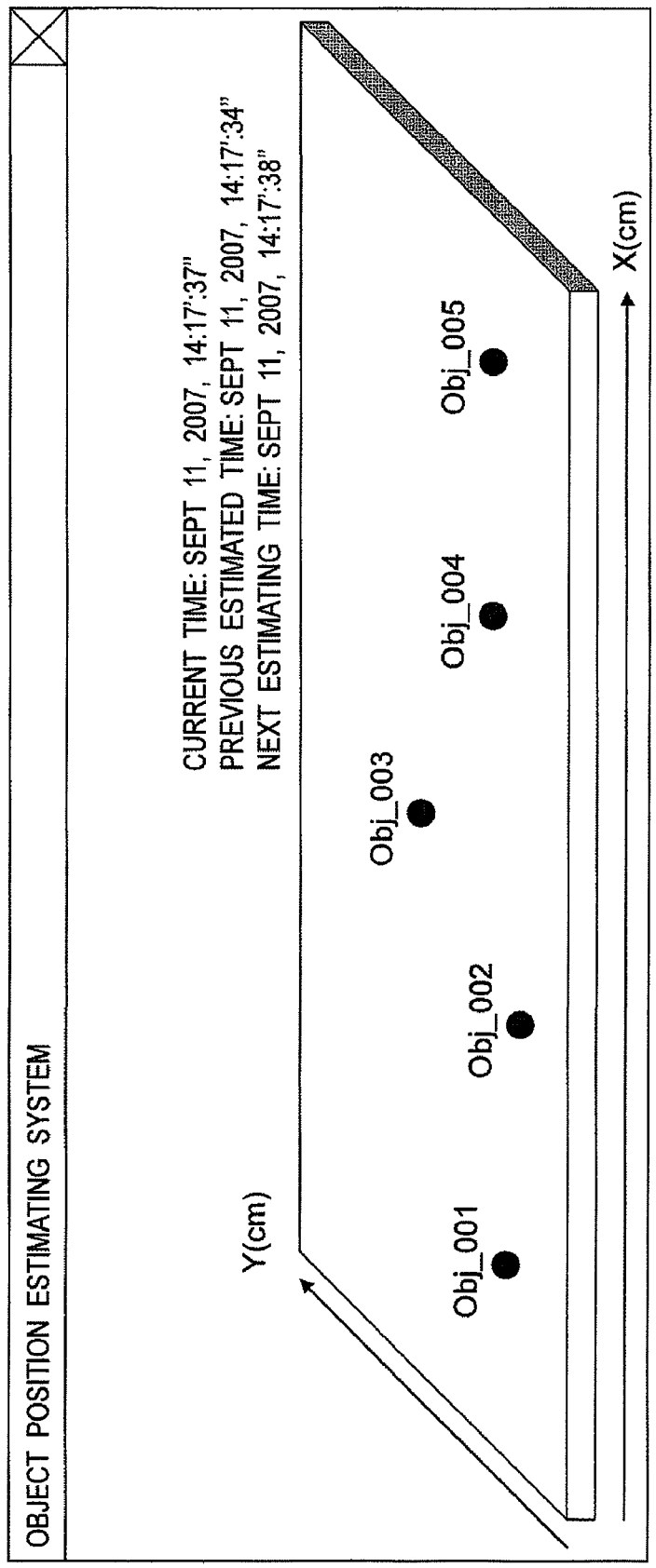
FIG. 22 is a view that shows one example of a display unit of the object position estimating system in accordance with the third embodiment of the present invention.

FIG. 22 shows display examples of the display unit 108. The display examples of FIG. 22 include respective pieces of information, such as estimated positions of the respective objects "Obj_001", "Obj_002", "Obj_003", "Obj_004", and "Obj_005", the current time, the previously estimated time and the next estimated time. It is supposed that the display unit 108 has a timer for acquiring the current time.

Figure 23:
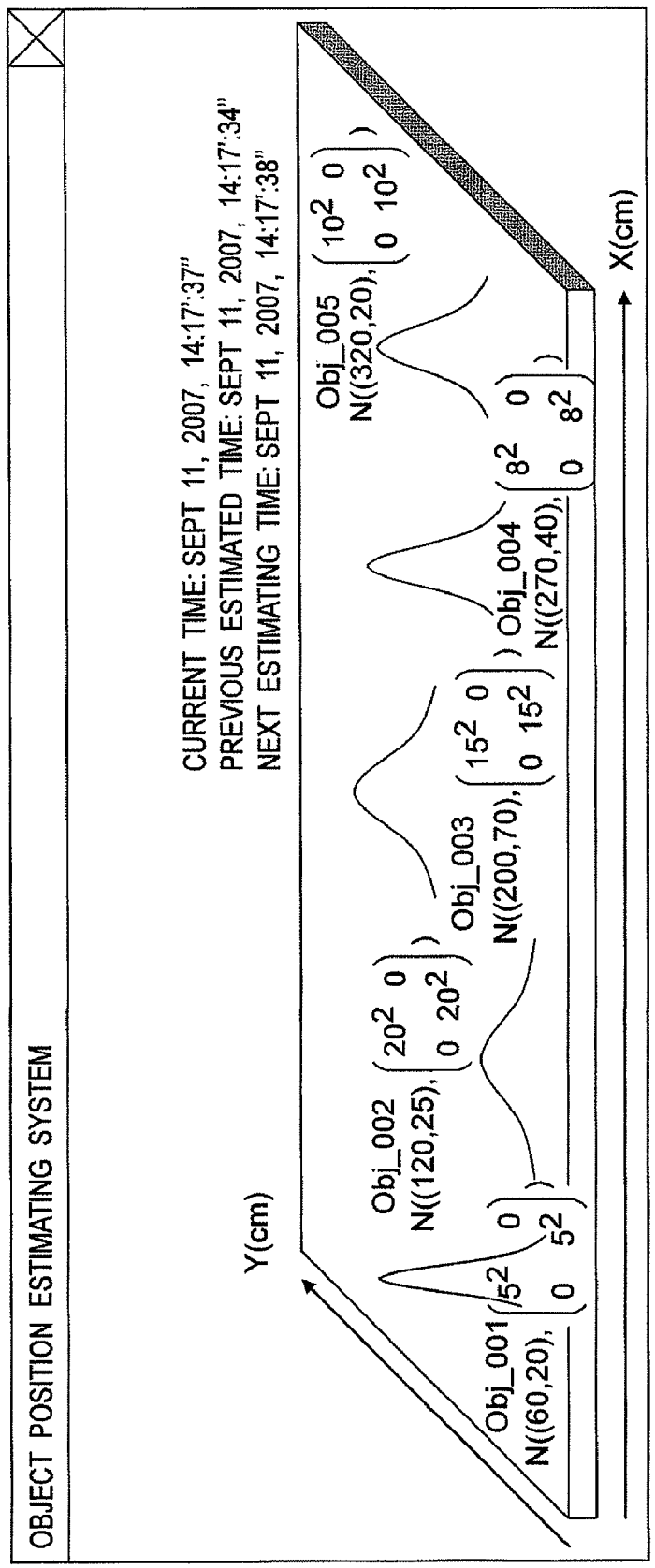
FIG. 23 is a view that shows one example of the display unit of the object position estimating system in accordance with the third embodiment of the present invention.

Moreover, the display unit 108 may display the object estimated position as a probability density distribution. FIG. 23 shows an example in which the object estimated position is given as the probability density distribution. FIG. 23 shows the average position and dispersion of the positions of the respective objects "Obj_001", "Obj_002", "Obj_003", "Obj_004", and "Obj_005", as numeric values and graphs.

Figure 24:
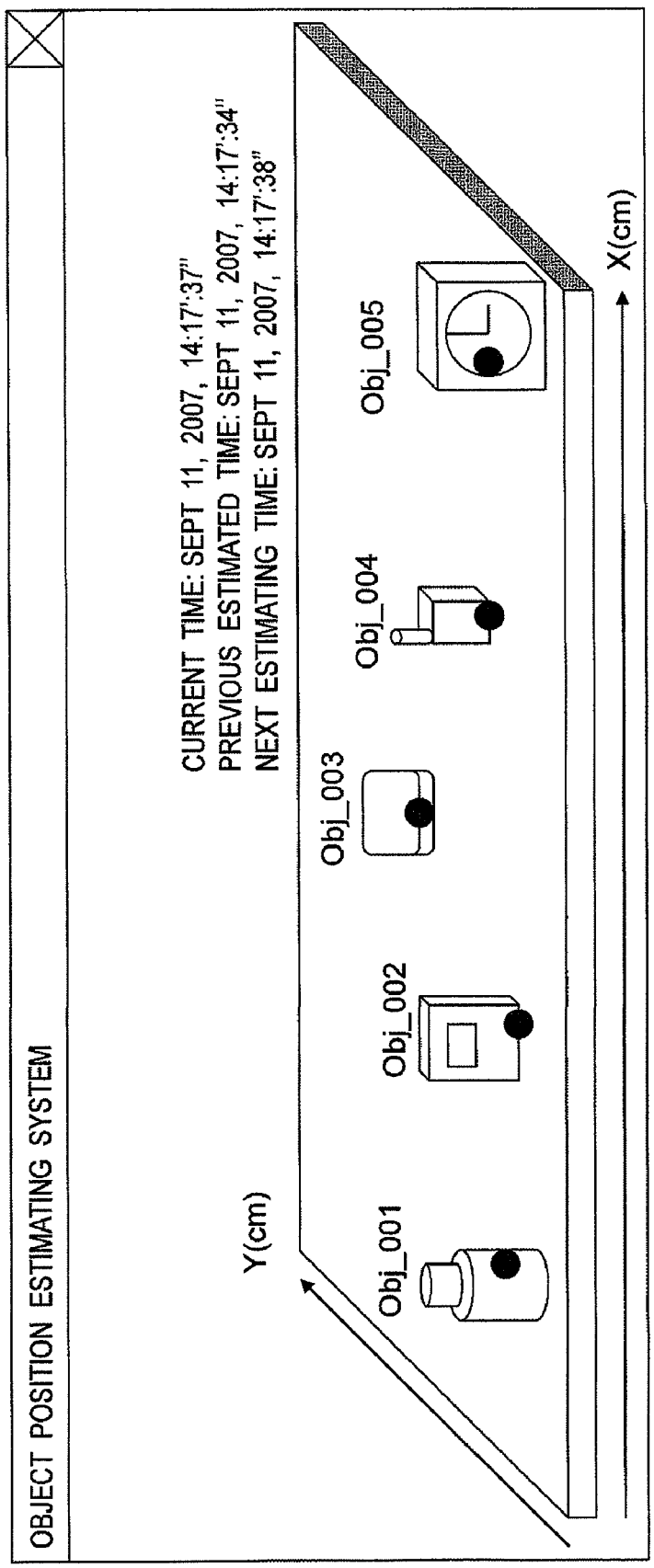
FIG. 24 is a view that shows one example of the display unit of the object position estimating system in accordance with the third embodiment of the present invention.

Moreover, the display unit 108 may display estimated positions of objects in an overlaid manner on an image of the actual environment (environment in the current time) (however, in the view, for simplicity of explanation, the room, house or the like are omitted from the drawing. In this case, the image of the actual environment refers to a view containing images of the objects, and the overlaid display includes estimated positions indicated by black circles and object IDs). FIG. 24 shows an example in which the estimated positions of the respective objects, "Obj_001", "Obj_002", "Obj_003", "Obj_004", and "Obj_005", are displayed in an overlaid manner on the image of the actual environment. Additionally, upon providing the overlaid display, not the image of the present actual environment, but the image obtained at the previous estimation time, may be displayed so that the positional relationship between the estimated positions of the objects in the actual environment and the objects S can easily be understood.

In accordance with the third embodiment, since the display unit 108 is installed, the user is allowed to recognize the estimated positions of objects and also to acquire the time at which the result of the next position estimation of the objects is outputted.

In the above-mentioned embodiments, the observation unit 101, the object database 102, the object identifying unit 103, the process completion time predicting unit 104, the observation database 105, the object position estimating unit 106, the parameter determination unit 107 and the like, or desired portions thereof, may be configured by pieces of software. Therefore, for example, a computer program including the respective steps of the object position estimating operations of the object position estimating system or the object position estimating apparatus of each of the first, second and third embodiments may be prepared, and readably stored in a recording medium, such as a storage device (hard disk or the like), and by allowing a temporary memory device (semiconductor memory or the like) of a computer to read the computer program, the program is executed by using the CPU so that the respective steps can be executed.

By properly combining the arbitrary embodiments of the aforementioned various embodiments, the effects possessed by the embodiments can be produced.

INDUSTRIAL APPLICABILITY

The object position estimating system, object position estimating apparatus, object position estimating method and object position estimating program of the present invention are designed to make parameters to be used for the object estimating process variable so as to effectively utilize a waiting period of time up to the next observation data storing time, required for an object position estimating process, so that both of a high-precision real time process and a high-precision object position estimating process can be achieved; thus, the present invention is effectively used as a retrieving system for objects at home or a tracking system for a movable object, such as a robot.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. An object position estimating system comprising:
an observation unit configured to observe a state of an environment that includes an object placed therein to acquire first and second observation raw data;
an object identifying configured to acquire an ID of the object and positional candidates of the object based upon object identifying data for each of IDs of objects, preliminarily stored in an object database, and the observation raw data of the respective first and second observation raw data, and to respectively store the acquired ID of the object and information of the positional candidates of the object in an observation database;
an object identifying process completion time predicting configured to acquire a number of the objects located within the environment based upon the respective observation raw data of the first and second observation raw data, and to predict a completion scheduled time of an object identifying process, based upon a time at which each number of the objects is acquired, the number of objects respectively acquired, and a period of time required for the object identifying process in which each of IDs of the object and the positional candidates of the object per object, preliminarily stored, are acquired, and to store the completion scheduled time of each of the object identifying processes in the observation database;
an object position estimating configured to acquire the ID of the object and the positional candidates of the object stored in the observation database, and to estimate a position of the object based upon the acquired ID of the object, the acquired positional candidates of the object, and a dispersion state of the positional candidates of the object; and
a parameter determination configured to refer to the completion scheduled time of the object identifying process of the second observation raw data stored in the observation database, at a time when the object identifying unit has acquired the ID of the object and the positional candidates of the object after completion of the object identifying process of the first observation raw data, and to determine as to whether or not the completion scheduled time of the object identifying process for the second observation raw data is stored in the observation database based upon the time that has been referred to, as well as, upon determination of a fact that the completion scheduled time of the object identifying process of the second observation raw data has been stored therein, to determine, by reference to a period of time required for carrying out a position estimating process for estimating the position of the object for each of the objects, preliminarily stored, a parameter by which a position estimating process of the object is carried out on the first observation raw data that has been subjected to the object identifying process, during a period of time from a time of the reference to the completion scheduled time of the object identifying process of the second observation raw data, while, upon determination of a fact that the completion scheduled time of the object identifying process of the second observation raw data has not been stored therein, to set a predetermined reference parameter as the parameter by which the position estimating process is carried out on the first observation raw data that has been subjected to the object identifying process,
wherein by using the parameter determined by the parameter determination unit, the object position estimating unit carries out the position estimating process on the object contained in the data that has been subjected to the object identifying process, from the data, and estimates the position of the object relating to the object ID based upon the object ID and the positional candidates acquired by the object identifying unit.

2. The object position estimating system as claimed in claim 1, wherein the object identifying data is shape information of the object, and the observation raw data is image data photographed by using a camera, or range data acquired by a range-measuring sensor, or positional data acquired by a tag reader.

3. The object position estimating system as claimed in claim 2, wherein the data obtained by the camera or the range-measuring sensor is subjected to an object identifying process through a template matching process;
the object identifying unit stores a matching score outputted in the template matching process in the observation database; and
the parameter determination unit determines an object to be subjected to the position estimating process in an order of a higher matching score.

4. The object position estimating system as claimed in claim 1, wherein upon using a particle filter, the object position estimating unit preliminarily prepares relational information between a processing period of time per object and a number of particles, and calculates a number of objects that are processable by using the particle filter based upon a period of time from the time of the reference to the completion scheduled time of the object identifying process of the second observation raw data, and in a case where the calculated number of objects is same as the number of the objects identified by the object identifying process, the particle filter, as it is, is used for the process,
while in a case where the calculated number of objects is smaller than the number of the objects identified by the object identifying process, the process is carried out with the number of particles per object being increased, and
in a case where the calculated number of objects is greater than the number of the objects identified by the object identifying process, the process is carried out with the number of particles per object being reduced.

5. The object position estimating system as claimed in claim 1, further comprising:
a display configured to display a result of estimation by the object position estimating unit,
wherein referring to the observation database, the display unit displays a completion scheduled time of a next object identifying process as an output time of result of next estimation of the object position estimating unit, while the display unit displays a time at which observation raw data relating to an output of current estimation result of the object position estimating unit as a point of time at which the current estimation result of the object position estimating unit is obtained.

6. An object position estimating system comprising:
a data input unit capable of inputting data relating to at least an ID and a position of an object that has been subjected to an object identifying process and completion scheduled time of the object identifying process that is inputted after completion of the object identifying process of the data;
an observation database to store the data relating to the ID and position of the object received from the data input unit and the data relating to the input scheduled time;
an object position estimating configured to estimate the position of the object based upon the data relating to the ID and position of the object stored in the observation database; and
a parameter determination configured to determine whether or not by reference to the completion scheduled time of the object identifying process stored in the observation database, the completion scheduled time of the object identifying process to be completed at an earliest time from a time of the reference is stored, and upon determination that the completion scheduled time of the object identifying process of the second observation raw data has been stored, by reference to a period of time required for carrying out the position estimating process for estimating the position of the object per object preliminarily stored, to determine a parameter by which the position estimating process of the object is carried out during a period of time from a time of the reference to the completion scheduled time of the object identifying process of the second observation raw data, while, upon determination of a fact that the completion scheduled time of the object identifying process of the second observation raw data has not been stored therein, to set a predetermined reference parameter as the parameter by which the position estimating process is carried out on the object,
wherein by using the parameter determined by the parameter determination unit, the object position estimating unit carries out a position estimating process on the object based upon the data relating to the ID and position of the object stored in the observation database so as to estimate the position of the object.

7. An object position estimating method comprising:
observing a state of an environment so that a plurality of pieces of observation raw data are acquired by an observation unit;
based upon the plurality of pieces of observation raw data, calculating an ID and a position of an object located within an observation range of the observation unit by using an object identifying unit so as to carry out the object identifying process;
predicting a point of time at which the object identifying process to be carried out by the object identifying unit is completed based upon each of the plurality of pieces of the observation raw data by using an object identifying a process completion time predicting unit so as to store the resulting times in an observation database;
referring to the completion scheduled time of the object identifying process stored in the observation database, determining as to whether or not the completion scheduled time of the object identifying process to be completed at an earliest point of time from the time of the reference is stored therein, by using a parameter determination unit;
upon determination of a fact that the completion scheduled time of the object identifying process of the second observation raw data has been stored therein, determining, by reference to a period of time required for carrying out the position estimating process for estimating the position of the object per object, preliminarily stored, a parameter by which the position estimating process is carried out on the object during a period of time from the time of the reference to the completion scheduled time of the object identifying process of the second observation raw data,
while, upon determination of a fact that the completion scheduled time of the object identifying process of the second observation raw data has not been stored therein, setting a predetermined reference parameter as the parameter by which the position estimating process is carried out on the object, by using the parameter determination unit,
wherein by using the parameter determined by the parameter determination unit, the object position estimating unit estimates the position of the object from the data relating to the ID and the position of the object calculated in the object identifying process.

8. A non-transitory computer readable medium storing an object position estimating program allowing a computer to carry out functions of: based upon a plurality of pieces of observation raw data acquired by observing a state of an environment by using an observation unit, calculating an ID and a position of an object located within an observation range of the observation unit so as to carry out an object identifying process; predicting a point of time at which the object identifying process to be carried out by the object identifying function is completed based upon each of the plurality of pieces of the observation raw data so as to store the resulting times in an observation database; referring to the completion scheduled time of the object identifying process stored in the observation database, determining as to whether or not the completion scheduled time of the object identifying process to be completed at an earliest point of time from a time of the reference is stored therein, and upon determination of a fact that the completion scheduled time of the object identifying process of the second observation raw data has been stored therein, determining, by reference to a period of time required for carrying out the position estimating process for estimating the position of the object per object, preliminarily stored, a parameter by which the position estimating process is carried out on the object during a period of time from a time of the reference to the completion scheduled time of the object identifying process of the second observation raw data, while upon determination of a fact that the completion scheduled time of the object identifying process of the second observation raw data has not been stored therein, setting a predetermined reference parameter as the parameter by which the position estimating process is carried out on the object, wherein by using the parameter determined by the parameter determination unit, carrying out an object position estimating function for estimating the position of the object, from the data relating to the ID and the position of the object calculated in the object identifying process by the object identifying process function.

* * * * *